United States Patent
Lee et al.

(10) Patent No.: US 8,660,064 B2
(45) Date of Patent: Feb. 25, 2014

(54) METHOD FOR TRANSMITTING AND RECEIVING PAGING INFORMATION IN A BROADBAND WIRELESS ACCESS SYSTEM

(75) Inventors: Eun Jong Lee, Anyang-si (KR); Doo-Hyun Sung, Anyang-si (KR); Jin-Soo Choi, Anyang-si (KR); Han Gyu Cho, Anyang-si (KR); Jong Young Han, Anyang-Si (KR); Kyu Jin Park, Anyang-si (KR); Hyung Ho Park, Anyang-si (KR); Jae Hoon Chung, Anyang-si (KR)

(73) Assignee: LG Electronics Inc., Seoul (KR)

(*) Notice: Subject to any disclaimer, the term of this patent is extended or adjusted under 35 U.S.C. 154(b) by 284 days.

(21) Appl. No.: 12/865,833

(22) PCT Filed: Jun. 3, 2009

(86) PCT No.: PCT/KR2009/002945
§ 371 (c)(1),
(2), (4) Date: Nov. 19, 2010

(87) PCT Pub. No.: WO2009/148258
PCT Pub. Date: Dec. 10, 2009

(65) Prior Publication Data
US 2011/0051668 A1 Mar. 3, 2011

Related U.S. Application Data

(60) Provisional application No. 61/058,553, filed on Jun. 3, 2008, provisional application No. 61/061,106, filed on Jun. 12, 2008.

(51) Int. Cl.
*H04W 4/00* (2009.01)
*H04L 12/28* (2006.01)
*G08C 17/00* (2006.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........... 370/328; 370/230; 370/311; 370/329; 370/351

(58) Field of Classification Search
None
See application file for complete search history.

(56) References Cited

U.S. PATENT DOCUMENTS 7,505,775 B2   3/2009   Ryu et al.
7,616,611 B2   11/2009  Hwang et al.
(Continued)

FOREIGN PATENT DOCUMENTS

CN   1875559 A   12/2006
CN   1973570 A   5/2007
(Continued)

*Primary Examiner* — Faruk Hamza
*Assistant Examiner* — Diane Lo
(74) *Attorney, Agent, or Firm* — Birch, Stewart, Kolasch & Birch, LLP

(57) ABSTRACT

A method for efficiently transmitting and receiving a paging message and system information from and in a mobile station of a broadband wireless access system is disclosed. A method for receiving a paging message in a mobile station comprise receiving paging information from a serving base station, the paging information including paging sub group identifier (paging sub_group ID) indicating a paging sub group to which the mobile station belongs; and receiving the paging message for a predetermined paging interval of the paging sub group, wherein the paging sub group is determined separately from a paging group and a geographical location determining the paging group, and is maintained while the mobile station is being operated in an idle mode.

16 Claims, 20 Drawing Sheets

MS 1, 3, 5 : paging sub group 1
MS 2, 4, 6 : paging sub group 2

(56) References Cited

U.S. PATENT DOCUMENTS

| | | |
|---|---|---|
| 2004/0198302 A1 | 10/2004 | Hutchison et al. |
| 2006/0009242 A1* | 1/2006 | Ryu et al. .................... 455/458 |
| 2006/0029011 A1* | 2/2006 | Etemad et al. ............... 370/311 |
| 2006/0194581 A1 | 8/2006 | Kang et al. |
| 2007/0057767 A1* | 3/2007 | Sun et al. .................... 340/7.35 |
| 2007/0087767 A1 | 4/2007 | Pareek et al. |
| 2007/0254679 A1* | 11/2007 | Montojo et al. ............. 455/458 |
| 2007/0254686 A1 | 11/2007 | Wang et al. |
| 2008/0188247 A1* | 8/2008 | Worrall ........................ 455/458 |

FOREIGN PATENT DOCUMENTS

| | | |
|---|---|---|
| CN | 101043706 A | 9/2007 |
| KR | 10-2006-0043526 A | 5/2006 |
| KR | 10-0661569 A | 12/2006 |

* cited by examiner

Figure 166-Paging groups example

MS 1, 3, 5 : paging sub group 1
MS 2, 4, 6 : paging sub group 2

METHOD FOR TRANSMITTING AND RECEIVING PAGING INFORMATION IN A BROADBAND WIRELESS ACCESS SYSTEM

CROSS REFERENCE TO RELATED APPLICATIONS

This application is the National Phase of PCT/KR2009/002945 filed on Jun. 3, 2009, which claims priority under 35 U.S.C. 119(e) to U.S. Provisional Application Nos. 61/058,553 filed on Jun. 3, 2008 and 61/061,106 filed on Jun. 12, 2008. The entire contents of all of the above applications is hereby incorporated by reference into the present application.

TECHNICAL FIELD

The present invention relates to a broadband wireless access system, and more particularly to, a method for transmitting and receiving paging information efficiently.

BACKGROUND ART

In the following description, a generally used paging group and an idle mode of a terminal are schematically explained.

FIG. 1 is a diagram illustrating a paging group in a general IEEE 802.16 system.

Referring to FIG. 1, a plurality of base stations (BS) supporting an idle mode belong to a paging group to construct a paging area.

In this case, the paging group indicates a logical group. If there is a traffic that targets a mobile station (MS), the object of the paging group is to provide a neighbor range area that can be paged in downlink (DL). And, the paging group should meet the condition to be large enough for a specific terminal to exist for most of time within a same paging group and the condition to be small enough for a paging load to maintain a proper level.

FIG. 1 shows four paging groups defined on multiple base stations located at hexagonal lattices. One base station is able to be included in one or more paging groups. The paging group is defined by a management system. And, a paging group is able to use a paging group-action backbone network message. Moreover, a list of terminal in idle mode is managed using a paging-announce message corresponding to one of backbone network messages and initial paging of all base stations belonging to a paging group can be managed.

Idle mode indicates an operation of supporting a terminal to periodically receive a downlink (DL) broadcast traffic transmission without registering at a specific base station when the terminal is moving in a wireless link environment constructed with multiple base stations.

Idle mode is able to give the benefit to a terminal by eliminating a handover-related activation requirement and general operation requirements. Idle mode is able to save power and operational resources used by a terminal in a manner of put limitation on a terminal action to be scanned in a discrete cycle.

Idle mode provides a simple and proper method of informing a terminal for a downlink traffic in pending and is able to give the benefit to a network and a base station by removing a wireless interface and a network handover (HO) traffic from an inactive terminal.

Hereinafter, an example of an operation procedure of a mobile station entering an idle mode in a general IEEE 802.16 system will be described with reference to FIG. 2.

Referring to FIG. 2, a mobile station can transmit a deregistration request (DREG-REQ) message to a serving base station to enter an idle mode from a normal mode (S201).

The serving base station which has received the DREG-REQ message can transmit and receive information of the mobile station and the serving base station to and from a paging controller. Namely, the serving base station can notify the paging controller of mobile station identifier (MSID) and serving base station identifier (BSID). Also, the paging controller can notify the serving base station of paging group identifier (PG ID) or paging controller identifier (PC ID). The paging group identifier or the paging controller identifier can be used to transmit and receive a paging message.

Subsequently, the serving base station can transmit a deregistration command (DREG-CMD) message to the mobile station. The serving base station can transmit the deregistration command (MOB_DREG-CMD) message to the mobile station in response to the deregistration request message. The deregistration command message can include paging information. At this time, the paging information can include parameters such as paging cycle, paging offset, and paging listening interval. The deregistration command message can further include paging controller identifier and paging group identifier (S203).

At this time, the paging information can be included in the deregistration command message in a type of Table 1 below. This information can be provided to the mobile station through a ranging response (RNG-RSP) message in a location update procedure which will be described later.

TABLE 1

| Type | Length | Value | Scope |
|---|---|---|---|
| 134 | 7 | Bits #0-15: PAGING_CYCLE - cycle in which the paging message is transmitted within the paging group. Bits #16-31: PAGING_OFFSET - determines the frame within the cycle from which the paging interval starts. Shall be smaller than PAGING_CYCLE value. Bits #32-47: Paging-group-ID - ID of the paging group the MS is assigned to. Bits #48-55: Paging Interval Length - Max duration in frames of Paging Listening interval. Used in calculation of Paging listening interval. value shall be between 1 and 5 frames (default = 2). Ð | RNG-RSPDREG-CMDÐ |

The parameters in Table 1 are user equipment-specific values, and different paging cycles, paging offsets and paging listening intervals can be allocated to the respective mobile stations. The base station can identify a paging interval of each mobile station through the parameters.

The mobile station which has received the DREG-CMD message from the serving base station identifies that a request of entrance to an idle mode is successfully accepted, and enters the idle mode. The mobile station can receive a paging message based on paging information received through the MOB_DREG-CMD message. Namely, the mobile station can monitor a radio channel to identify the presence of a paging message transferred thereto for a paging listening interval. The mobile station is operated in a sleep mode (or the radio channel is turned off) for the other interval to reduce power consumption (S204).

A call or external packet can be transmitted to the paging controller (S205).

In this case, the paging controller can perform a paging procedure of the mobile station. At this time, the paging controller can transmit a paging announcement message to all base stations within the paging group (S206).

All the base stations within the paging group, which have received the paging announcement message, can broadcast a MOB_PAG-ADV message to all mobile stations managed by the base stations. At this time, the paging message can include parameters of Table 2 (S207).

ing controller or the base station. The paging intervals will be described with reference to FIG. 3.

FIG. 3 is a diagram illustrating different paging intervals of two different mobile stations, which belong to the same paging group in a general communication system.

Referring to FIG. 3, it is assumed that two mobile stations MS1 and MS2 exist in the same paging group. At this time, in the mobile station MS1, the first frame of the paging cycle can be established as a paging interval, and in the mobile station MS2, the fourth frame of the same paging cycle can be established as a paging interval.

Next, a procedure of updating system information in a mobile station which is in an idle mode will be described.

The mobile station which is in the idle mode wakes up for only a listening interval and then receives a paging message. Subsequently, the mobile station takes a corresponding action in accordance with an action code value. For example, if an action code corresponding to the mobile station is '0', the mobile station does not take any action. If an action code corresponding to the mobile station is '1', the mobile station can perform ranging for location update.

It is assumed that a downlink channel descriptor (DCD) message, an uplink channel descriptor (UCD) message or neighboring cell information transmitted from a preferred

TABLE 2

| Syntax | Size (bit) | Notes |
|---|---|---|
| for (i = 0; i < Num_Paging_Group_IDs; i++) { | — | — |
| Paging Group ID | — | 16 |
| } | — | — |
| Num_MACs | — | Number of MS MAC addresses |
| For (j = 0; j < Num_MACs; j++) { | — | — |
| MS MAC Address hash | 24 | The hash is obtained by computing a CRC24 on the MS 48-bit MAC address. The polynomial for the calculation is 0x1864CFB |
| Action Code | 2 | Paging action instruction to MS 0b00 = No action required 0b01 = Perform ranging to establish location and acknowledge message 0b10 = Enter network 0b11 = Reserved |
| Reserved | 6 | — |
| } | — | — |
| Padding | variable | Padding bits to ensure octet aligned |
| TLV Encoded Information | variable | TLV-specific |
| } | — | — |

The mobile station checks the MOB_PAG-ADV message. If the mobile station is paged by the paging controller, the mobile station enters a normal mode and is then able to perform communications with the serving base station (S208, S209).

In a general communication system, mobile stations belonging to the same paging group can have different paging intervals. These paging intervals can be managed by the pagbase station of the mobile station which is in the idle mode is updated. At this time, in a general wireless communication system, the preferred base station can notify the mobile station of a frame where a message containing the updated DCD/UCD or neighboring cell information is transmitted by transmitting a broadcast control pointer information element (Broadcast_Control_Pointer_IE) to the mobile station. Table 3 illustrates contents that can be included in the broadcast control pointer information element.

TABLE 3

| Syntax | Size (bit) | Notes |
|---|---|---|
| Broadcast_Control_Pointer_IE( ) { | — | — |
| Extended DIUC | 4 | Broadcast_Control_Pointer_IE( ) = 0xA |
| Length | 4 | Length in bytes |
| DCD_UCD Transmission Frame | 7 | The most significant bits of the frame number's least 9 significant bits of the next DCD and/or UCD transmission. |
| Skip Broadcast_System_Update | 1 | — |
| If (Skip Broadcast_System_Update == 0) { | — | — |
| Broadcast_System_Update_Type | 1 | Shows the type of Broadcast_System_Update0: For MOB_NBR-ADV Update 1: For Emergency Services Message |
| Broadcast_System_Update _Transmission _Frame | 7 | The least significant bits of the frame number of the next Broadcast_System_Update transmission. |
| } | — | — |
| } | — | — |

Referring to Table 3, the broadcast control pointer information element can include information of a frame (DCD_UCD transmission frame) where the DCD/UCD messages are transmitted, and a frame (broadcast system_update_transmission_frame) for update of broadcast system information.

Unlike the mobile station which is in an active mode, the mobile station which is in the idle mode can receive a message by waking up for only a listening interval. Since the updated DCD or UCD message has a relatively great transmission cycle (maximum ten seconds), if the updated message is not transmitted within the listening interval of each mobile station, each mobile station may not receive the updated message. Such a case will be described with reference to FIG. 4.

FIG. 4 is a diagram illustrating an operation procedure of updating system information through a mobile station, which is in an idle mode, in a general communication system.

Referring to (a) of FIG. 4, the mobile station can receive the broadcast control pointer information element from the preferred base station for only its listening interval. The mobile station can wake up to receive the updated system information even if a frame indicated by the broadcast control pointer information element does not correspond to the listening interval of the mobile station. The mobile station can again sleep until next listening interval if the updated system information is successfully received.

However, it may be assumed that the mobile station fails to receive the updated system information from the frame indicated by the broadcast control pointer information element as illustrated in (b) of FIG. 4. At this time, the mobile station may have to receive system information by waking up until next interval where system information is transferred.

DISCLOSURE OF INVENTION

Technical Problem

In a general broadband wireless access system, a paging controller that manages a paging procedure of a mobile station should report paging information (paying cycle, paging offset, paging interval, etc.) of a corresponding mobile station to a base station if the mobile station is paged. This is because that the base station can exactly transmit a paging message to the corresponding mobile station only when knowing an interval where the mobile station wakes up.

In the worst case, a base station may have to transmit the paging message every frame in accordance with a distribution of paging intervals of mobile stations which are in idle mode.

Furthermore, even though a mobile station which is in an idle mode knows a frame where system information is transmitted by successfully receiving a broadcast control pointer information element (IE) from a preferred base station so as to update system information, the mobile station may fail to receive the system information.

Moreover, it is assumed that sub maps are multiplexed with one cyclic redundancy check (CRC) in a general system (for example, IEEE 802.16e system), like a downlink map or an uplink map (DL/UL-MAP). In this case, the mobile station waking up from a paging subframe should decode the whole sub maps. Also, if the sub maps are transmitted through a separate CRC attachment in accordance with connection identifier (CID) (for example, CRC or CID masking), the mobile station performs blind decoding for all sub maps through corresponding CID in a general system (for example, long term evolution (LTE) system), thereby detecting control signals transmitted thereto. In case of a general wireless communication system, broadcast CID is used to transmit a paging message. If the message is transmitted using broadcast CID, the mobile stations which are in a normal mode as well as the mobile stations which are in an idle mode may all receive the paging message. If the mobile station which is in a normal mode receives a paging message, it causes unnecessary power consumption of the mobile station and increases decoding overhead of the mobile station.

The present invention is devised to substantially obviate one or more problems due to limitations and disadvantages of the related art. An object of the present invention is to provide method for efficiently updating system information in a mobile station which is in an idle mode.

Another object of the present invention is to provide a method for efficiently paging a mobile station.

Other object of the present invention is to provide an operation method for efficiently saving the power of a mobile station.

It is to be understood that the technical problems to be achieved by the present invention are not limited to the aforementioned problems and other technical problems which are not mentioned will be apparent from the following description to the person with an ordinary skill in the art to which the present invention pertains.

Technical Solution

In order to solve the above technical problems, the present invention provides various methods for efficiently transmitting and receiving a paging message.

In one aspect of the present invention, a method for receiving a paging message in a mobile station comprises receiving paging information from a serving base station, the paging information including paging sub group identifier (paging_sub_group ID) indicating a paging sub group to which the mobile station belongs; and receiving the paging message for a predetermined paging interval of the paging sub group, wherein the paging sub group is determined separately from a paging group and a geographical location determining the paging group, and is maintained while the mobile station is being operated in an idle mode.

At this time, the paging interval is established in a subframe unit.

Also, the method further comprises receiving paging indication information indicating whether a paging message of at least one paging sub group is transmitted. In this case, the step of receiving the paging message is performed when the paging indication information indicates the paging sub group to which the mobile station belongs.

Also, the paging indication information includes at least one of bits indicating whether the paging message of at least one paging sub group is transmitted, and if the paging indication information is transmitted twice or more within the paging cycle, the paging indication information is transmitted at different superframes.

Also, the paging indication information is transmitted at a first subframe of a superframe where a paging cycle starts, through any one of a superframe header (SFH), a broadcast channel (BCH) included in the superframe header, a data region of the first subframe, and a sub-packet of a secondary superframe header.

Also, the paging interval is a subframe after predetermined offset established in accordance with the paging sub group from the subframe from which the paging indication information is transmitted.

Also, the bits respectively represent whether the paging message of one paging sub group is transmitted, and if the paging indication information includes bits of all paging sub groups belonging to a predetermined paging group, the paging information is broadcasted to the mobile station through the superframe header.

Also, the paging message further includes a system information update indication (SIUI) field, the method further comprises performing update of system information if the SIUI field indicates update of the system information.

Also, the step of performing update of system information includes acquiring system information by decoding a superframe header (SFH) received after a superframe where the paging message including the system information update indication field is transmitted.

Also, the paging message is transmitted to the mobile station through a downlink resource indicated by predetermined paging message control information included in a sub-map of a subframe corresponding to the paging interval, the predetermined paging message control information is CRC masked by predetermined paging CID for a specific mobile station of an idle mode, and the mobile station performs blind decoding for the predetermined paging message control information using its paging CID.

Also, the predetermined paging message control information has a size previously established in a previously established location of the sub-map.

In another aspect of the present invention, a method for transmitting a paging message from a base station to a mobile station comprises receiving a deregistration request message from the mobile station; transmitting a deregistration command message including paging information to the mobile station, the paging information including paging sub group identifier (paging_sub_group ID) indicating a paging sub group to which the mobile station belongs; and transmitting a paging message to the mobile station for a predetermined paging interval of the paging sub group, wherein the paging sub group is established separately from a paging group and a geographical location determining the paging group, and is maintained while the mobile station is being operated in an idle mode.

At this time, the paging interval is established in a subframe unit.

Also, the method further comprises receiving a paging indication message of the mobile station from a paging controller; and transmitting paging indication information to the mobile station, the paging indication information indicating whether a paging message of a paging sub group to which the mobile station belongs is transmitted.

Also, the paging indication information is transmitted from a first subframe of a superframe where a paging cycle starts, through any one of a superframe header (SFH), a broadcast channel (BCH) included in the superframe header, a data region of the first subframe, and a sub-packet of a secondary superframe header.

Also, the step of transmitting a paging message is performed at a subframe after predetermined offset previously determined for a paging sub group to which the mobile station belongs, from a subframe where the paging indication information is transmitted.

In other aspect of the present invention, a method for receiving a paging message in a mobile station of an idle mode comprises monitoring the paging message for a first paging cycle; and increasing the first paging cycle by a predetermined value if the paging message is not received for the first paging cycle.

At this time, the step of monitoring the paging message and the step of increasing the first paging cycle are repeated as much as the number of times, which is previously determined.

Also, the step of increasing the first paging cycle is performed until the first paging cycle becomes equal to a maximum paging cycle which is previously determined.

Advantageous Effects

According to the present invention, the following advantages can be obtained.

First of all, the mobile station which is in the idle mode can update system information more efficiently.

Second, it is possible to page the mobile station which is in the idle mode, more efficiently.

Finally, the mobile station can be operated in the idle mode more efficiently.

It is to be understood that the advantages that can be obtained by the present invention are not limited to the aforementioned advantages and other advantages which are not mentioned will be apparent from the following description to the person with an ordinary skill in the art to which the present invention pertains.

MODE FOR THE INVENTION

Figure 1:
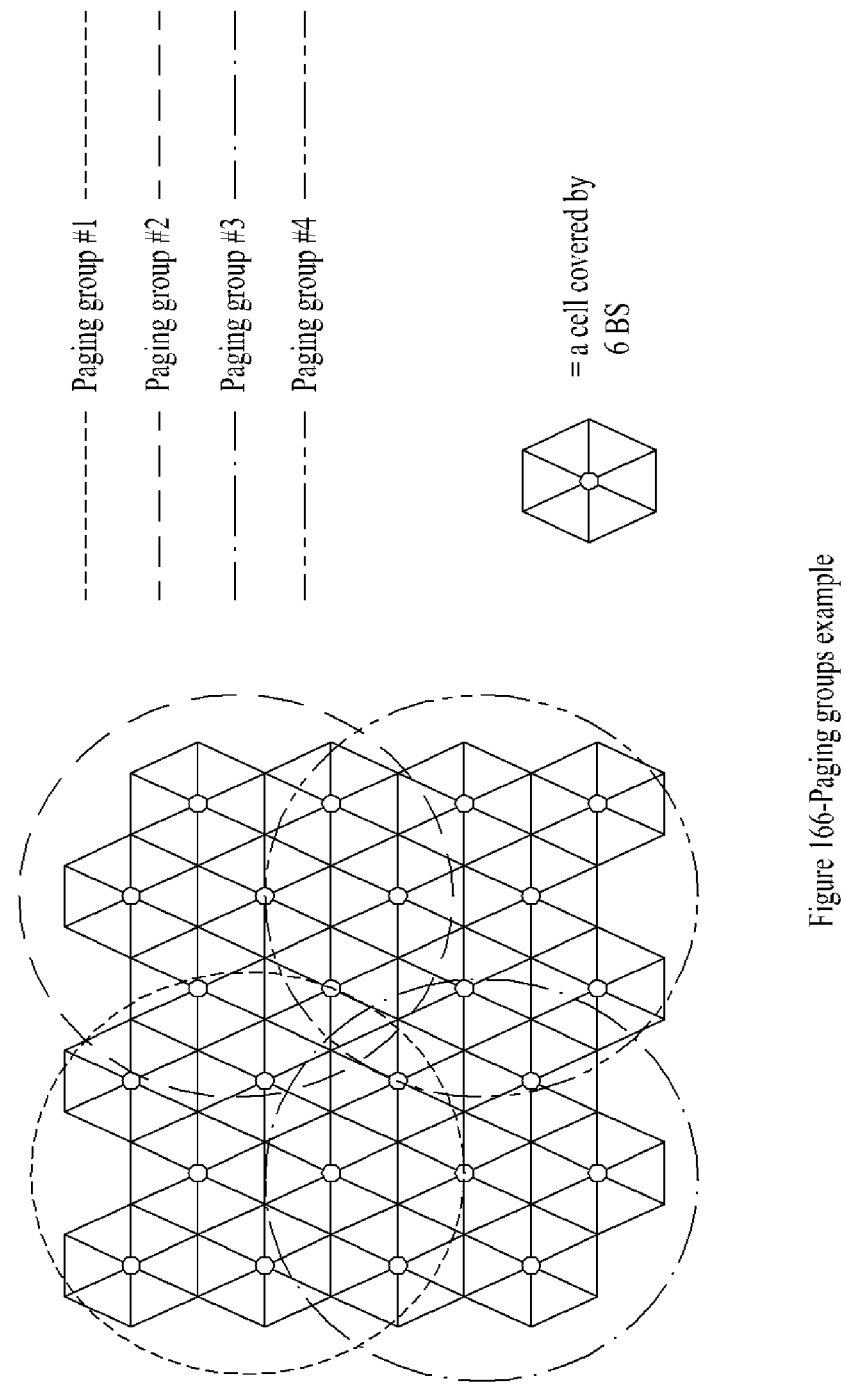
FIG. 1 is a diagram illustrating a paging group in a general IEEE 802.16 system.
Figure 2:
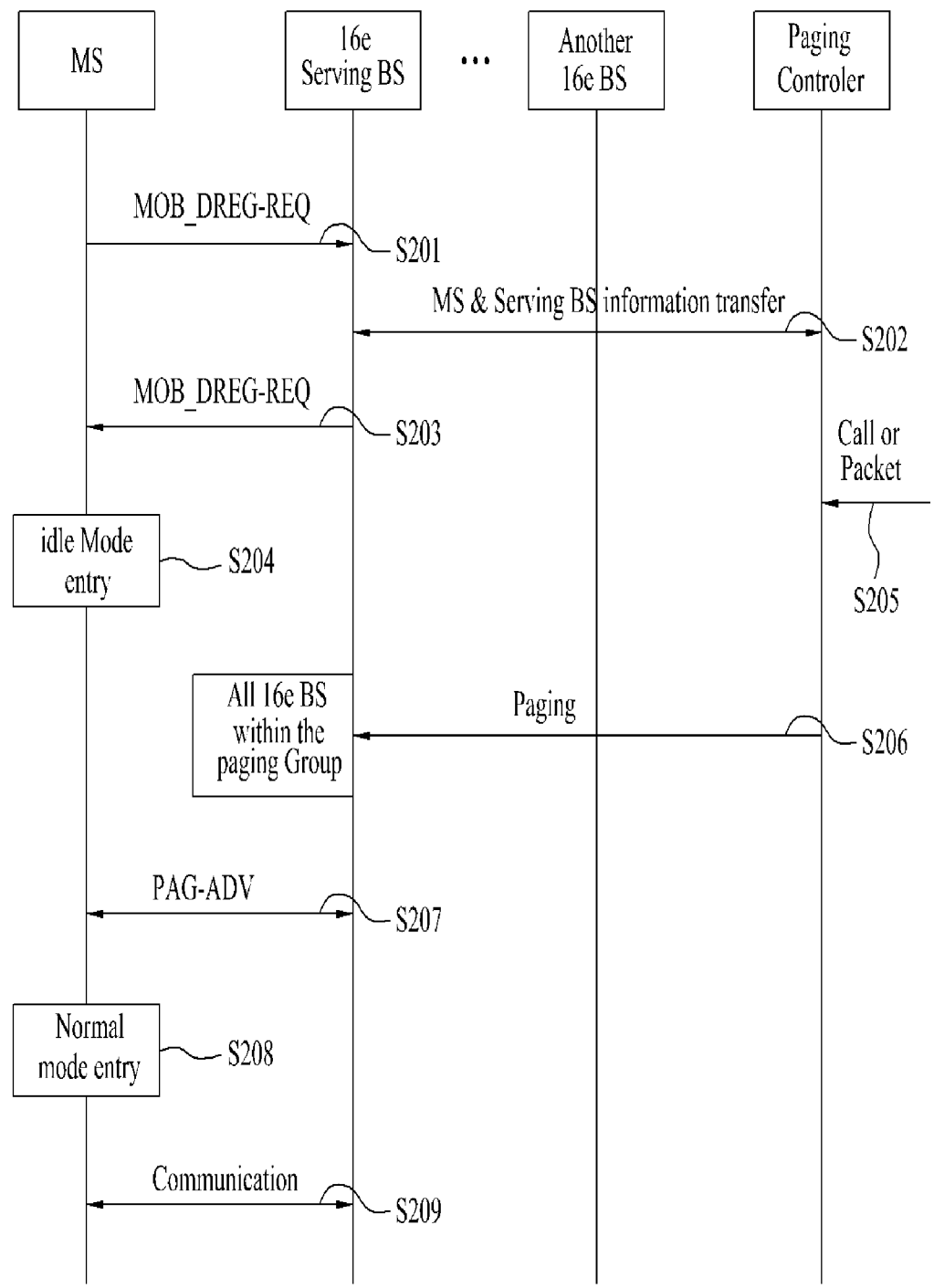
FIG. 2 is a diagram illustrating an example of an operation procedure of a mobile station which enters an idle mode in a general IEEE 802.16 system.
Figure 3:
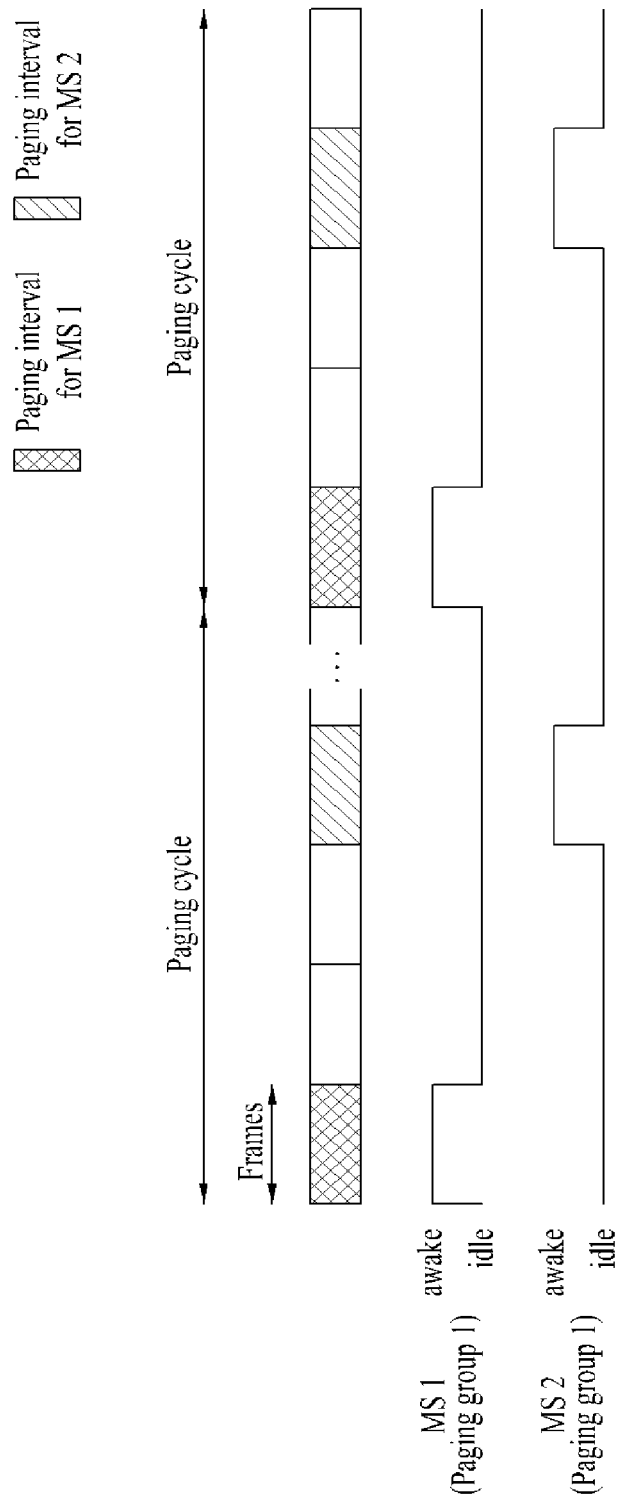
FIG. 3 is a diagram illustrating paging intervals of two different mobile stations belonging to the same paging group in a general communication system.
Figure 4:
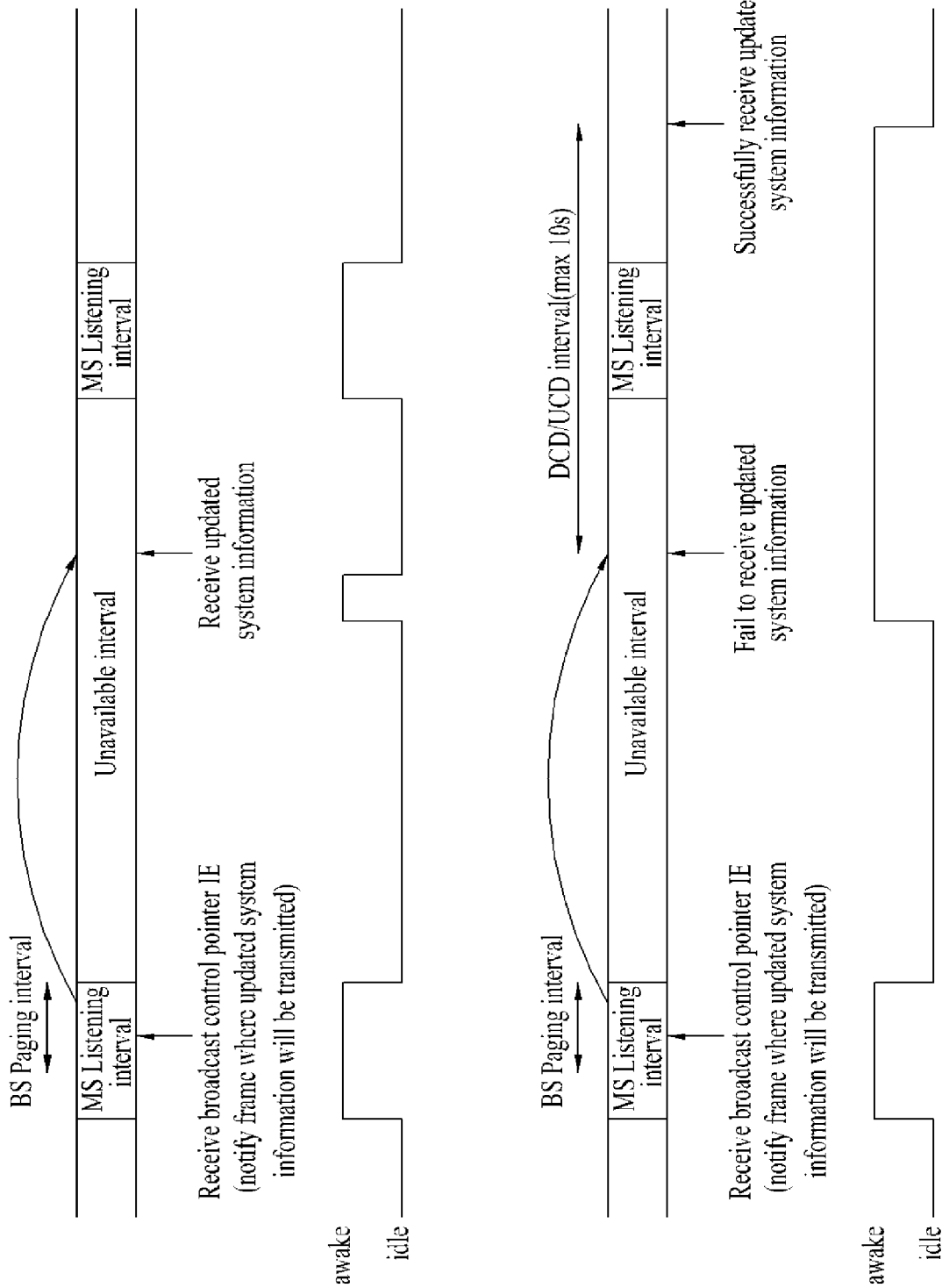
FIG. 4 is a diagram illustrating an operation procedure of updating system information through a mobile station, which is in an idle mode, in a general communication system.

The present invention relates a wireless access system. Hereinafter, methods for paging a mobile station more efficiently in accordance with the embodiments of the present invention will be described.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will be omitted, and procedures or steps equivalent to the range that can be understood by those skilled in the art will be omitted.

The embodiments of the present invention have been described based on the data transmission and reception between a base station and a mobile station. In this case, the base station means a terminal node of a network, which performs direct communication with the mobile station. A specific operation which is described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as a user equipment (UE), a subscriber station (SS), a mobile subscriber station (MSS), and a terminal.

Furthermore, a transmitter means a fixed and/or mobile node that transmits data service or voice service, and a receiver means a fixed and/or mobile node that receives data service or voice service. Accordingly, in an uplink, the mobile station could be a transmitter, and the base station could be a receiver. Likewise, in a downlink, the mobile station could be a receiver, and the base station could be a transmitter.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone. Also, examples of the mobile station include a personal digital assistant (PDA), a hand-held PC, a notebook PC, a smart phone, and a multi mode-multi band (MM-MB) terminal.

In this case, the smart phone means a terminal having advantages of a mobile communication terminal and a personal mobile terminal in combination. Namely, the smart phone can mean a terminal that data communication functions such as schedule management, facsimile transmission and reception, and Internet access, which correspond to functions of the personal mobile terminal, are added to the mobile communication terminal. Also, the multi mode-multi band terminal means a mobile terminal having a multi-modem chip to be operated in a portable Internet system and other mobile communication systems (for example, code division multiple access (CDMA) 2000 system, WCDMA system, etc.).

The embodiments according to the present invention may be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Hereinafter, the preferred embodiments according to the present invention will be described in detail with reference to the accompanying drawings. It is to be understood that the detailed description which will be disclosed together with the accompanying drawings is intended to describe exemplary embodiments of the present invention and is not intended to describe unique embodiments by which the present invention can be carried.

Furthermore, specific terminologies hereinafter described are provided to assist understanding of the present invention, and various modifications can be made in the specific terminologies within the range that they do not depart from technical spirits of the present invention.

The present invention suggests a paging sub group that can be determined separately from a paging group classified by a geographic location to perform efficient paging. The paging sub group can also be MS-specifically determined (e.g., using MS identifier).

Figure 5:
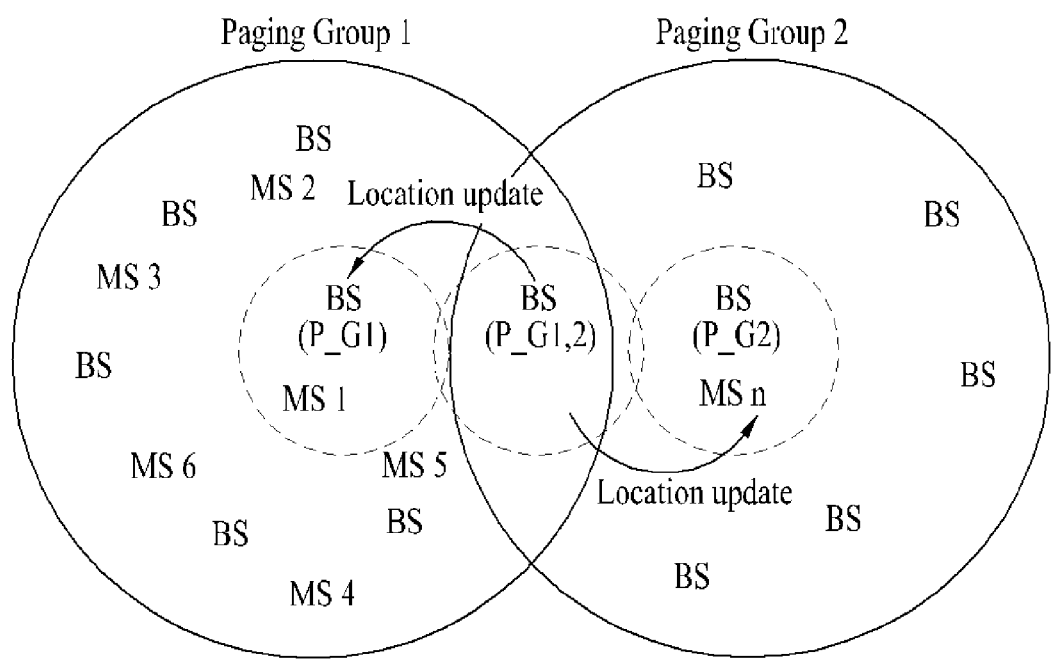
FIG. 5 is a conceptional view of a paging group that can be used in a general wireless communication system and a paging sub group that can be used in the embodiments of the present invention.

FIG. 5 is a conceptional view of a paging group that can be used in a general wireless communication system and a paging sub group that can be used in the embodiments of the present invention.

Referring to FIG. 5, when a mobile station moves from its paging group region (for example, P_G1) to another paging group region (P_G2), the mobile station can perform location update. As a result, a new paging group identifier (PGID) is given to the mobile station, and the mobile station belongs to a new paging group. However, since a paging sub group is determined separately from the paging group defined in accordance with the geographic location, the paging sub group can be maintained regardless of a location of the mobile station. Accordingly, if paging intervals of all mobile stations belonging to the same paging sub group are determined equally, the mobile station can receive a paging message at the same time of a paging cycle regardless of a change of the paging group, which is caused by movement of the mobile station.

For example, it is assumed that three mobile stations MS1, MS3, and MS5 are established to a paging sub group 1 as illustrated in FIG. 5. If the mobile station MS1 moves from the region P_G1 to the region P_G2, the paging group of the mobile station MS1 can be updated through a location update procedure. However, since the paging sub group is not related with the geographic location, the mobile station may continuously be maintained at the paging sub group 1. Hereinafter, a number of the paging sub group can be used as the same meaning of paging sub group ID. Namely, paging sub group ID of the paging sub group 1 could be 1.

This paging sub group can be determined by mobile station ID (MSID) without separate signaling between a base station the mobile station. In this case, in order to determine the paging sub group, the mobile station or the base station can identify a paging sub group of a corresponding mobile station by using a method of the following Math Figure 1.

$$\text{Paging Sub Group ID} = MS\_ID \text{ modulo } N \qquad \text{[Math Figure 1]}$$

In the Math Figure 1, 'N' represents the number of paging sub groups, and can be transferred to the mobile station through system information.

Also, the paging sub group can be given to the mobile station by a paging controller or the base station through a deregistration command (DREG-CMD) message during idle mode entry or a ranging response (RNG-RSP) message during location update. This will be described with reference to Table 4.

Table 4 illustrates an example that paging sub group information is included in the deregistration command message or the ranging response message that can be used in the embodiments of the present invention.

TABLE 4

| Type | Length | Value | Scope |
|------|--------|-------|-------|
| xxx | x | PAGING_CYCLE PAGING_OFFSETPaging Interval LengthPaging-group-ID Paging-sub-group-ID: mobile station is grouped once more in sub group not geographical grouping. | RNG-RSPD REG-CMD |

Referring to Table 4, the base station can notify the mobile station of the paging sub group in such a manner that a paging sub group ID value is added to a type length value (TLV) indicating paging information in the deregistration command message or the ranging response message.

The present invention additionally suggests a paging subframe together with the aforementioned paging subgroup. The paging subframe means a subframe where the paging message is transmitted. The paging subframe will be described with reference to FIG. 6.

Figure 6:
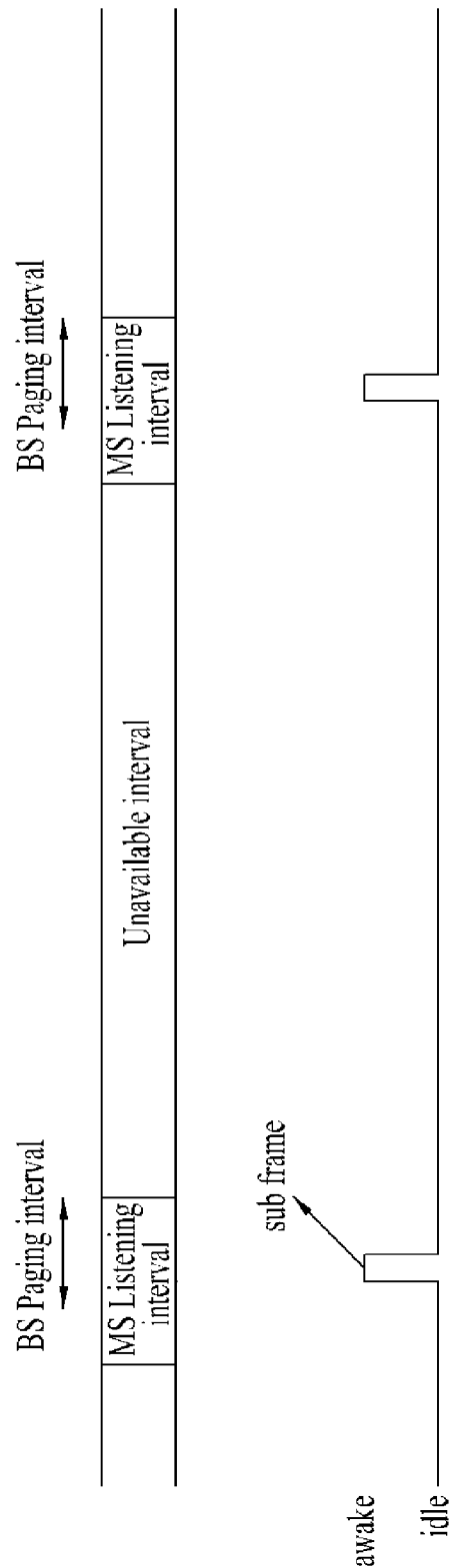
FIG. 6 is a diagram illustrating a paging interval to which a paging subframe that can be used in the embodiments of the present invention is applied and an operation of a mobile station.

FIG. 6 is a diagram illustrating a paging interval to which a paging subframe that can be used in the embodiments of the present invention is applied and an operation of a mobile station.

In a general wireless communication system, a paging message monitoring interval unit of the mobile station is a frame. However, if the paging subframe is applied as illustrated in FIG. 6, the mobile station can monitor the paging message in a subframe unit. Accordingly, the mobile station can save the power more efficiently. To this end, the TLV indicating paging information in the ranging response message or the deregistration command message transmitted from the base station to the mobile station can be modified as illustrated in Table 5.

TABLE 5

| Type | Length | Value | Scope |
|------|--------|-------|-------|
| xxx | x | PAGING_CYCLE PAGING_OFFSET: determines the subframe within the cycle in which the paging message is transmitted. Must be smaller than PAGING_CYCLE. Paging Interval Length: Max duration in subframes of paging interval. (default = 1)Paging-group-ID | RNG-RSPD REG-CMD |

Referring to Table 5, paging offset and paging interval length can be established in a subframe unit.

According to the embodiments of the present invention, the mobile stations belonging to the same paging sub group can have the same paging interval regardless of the paging group. Namely, the mobile stations belonging to different paging sub groups wake up at different paging intervals and then identify the paging message while the mobile stations belonging to the same paging sub group wake up at the subframe of the same paging interval and then identify the paging message.

Hereinafter, a method for efficiently transmitting a paging message using the aforementioned paging sub group and paging subframe will be described in more detail.

1. Paging Scheme Using Arbitrary Paging Subframe

According to one embodiment of the present invention, a paging message can be transmitted from a arbitrary subframe.

Generally, a listening interval (MS Listening Interval) of a mobile station and a Paging Interval (BS paging interval) of a base station can be defined in a frame unit through paging information that can be transmitted to the mobile station through a deregistration command message or a ranging response message. However, in this embodiment, the mobile station can receive a paging message by waking up at only a arbitrary subframe of a corresponding frame. At this time, mobile stations belonging to the same sub group can check for the paging message by waking up at the same subframe. This will be described with reference to FIG. 7.

Figure 7:
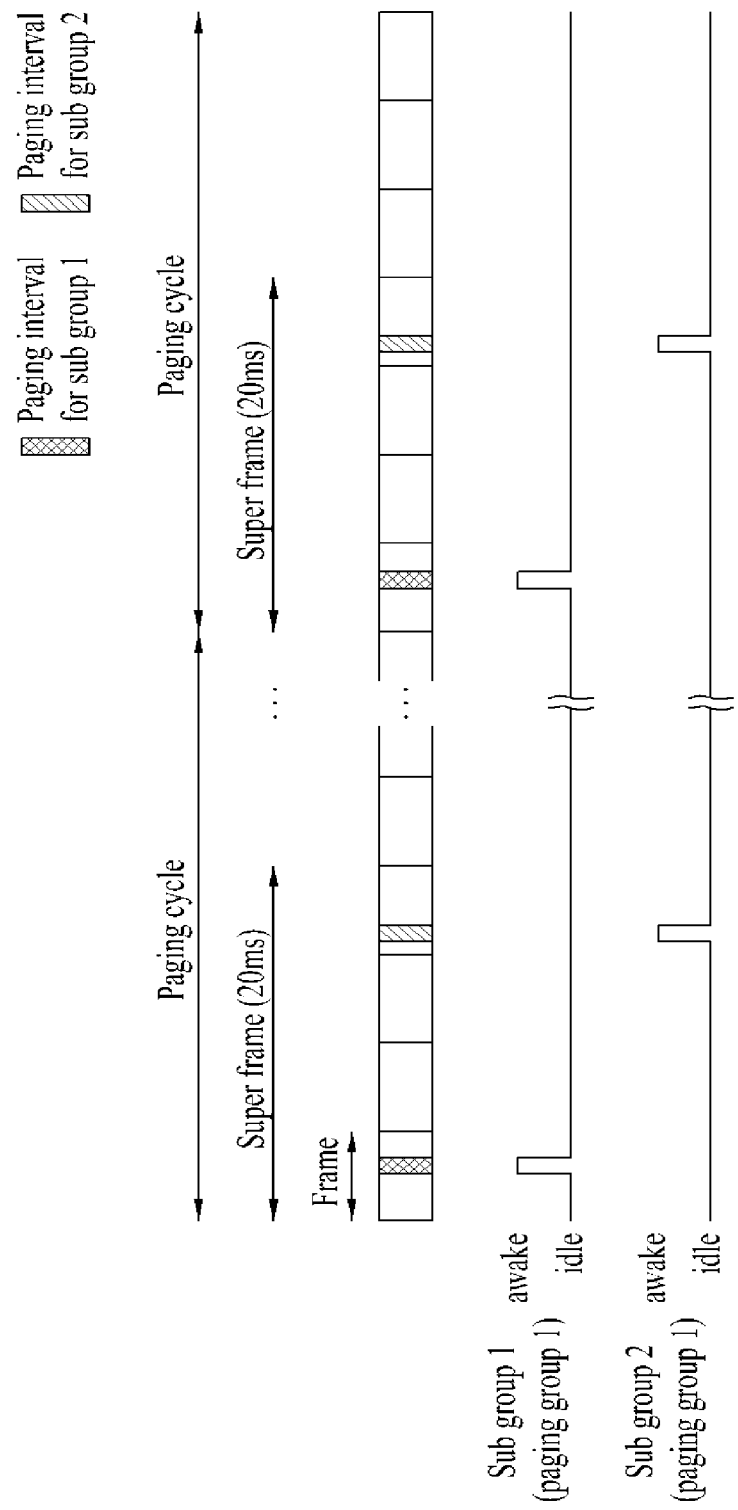
FIG. 7 is a diagram illustrating a paging subframe per paging sub group according to one embodiment of the present invention.

FIG. 7 is a diagram illustrating a paging subframe per paging sub group according to one embodiment of the present invention.

In the following embodiments including the embodiment of FIG. 7, it is assumed that all paging sub groups belong to one paging group. It is also assumed that all mobile stations belonging to the same paging group have the same paging cycle regardless of a paging interval (paging subframe) that can be defined by the paging sub group.

Referring to FIG. 7, mobile stations belonging to the paging sub group 1 can receive the paging message by waking up at only a arbitrary paging subframe of the first frame even though the first frame of the paging cycle is defined as the paging interval. Also, mobile stations belonging to the paging sub group 2 can receive the paging message by waking up at only a arbitrary paging subframe of the fourth frame even though the fourth frame of the paging cycle is defined as the paging interval.

1-1. Method for Receiving a Paging Message from a Paging Subframe of a Paging Sub Group A mobile station woken up at a arbitrary paging subframe can receive a paging message, and can decode the paging message to identify whether the presence of its paging information. Mobile stations belonging to the same paging sub group receive the paging message from the same paging subframe.

For example, it is assumed that a mobile station MS1 belongs to a paging sub group 1, and a paging subframe designated in the paging sub group 1 is N. At this time, if there is no paging message transmitted from the paging subframe of the MS1, i.e., subframe N, it may mean that all mobile stations belonging to the paging sub group 1 are not paged. In this case, all mobile stations belonging to the paging sub group 1 can enter an idle mode again.

By contrast, if there is a paging message transmitted at the paging subframe N, all mobile stations belonging to the paging sub group 1 can identify the presence of its paging action code by decoding the paging message. The mobile station which is commanded to perform network reentry in accordance with the paging action code can be operated in a normal mode by waking up from the idle mode. The mobile station which is commanded to perform location update can enter the idle mode after performing location update. The mobile station which has not received any command can enter the idle mode until next paging subframe.

1-2. Method for Updating System Information of a Paging Sub Group

If a paging message is transmitted from a arbitrary subframe, a mobile station may have a difficulty to know the presence of system information update at the time when the mobile station wakes up. For this reason, according to the related art, the mobile station has known a frame where updated system information is transmitted using a broadcast control pointer information element (IE) which is transmitted to the mobile station during a paging interval.

However, in an advanced system, for example, a system that periodically transmits system information, like a wireless communication system subject to the IEEE 802.16m standard, it is not required to notify the mobile station of a location where system information will be transmitted. In the current IEEE 802.16m system, the base station can transmit a broadcast channel (BCH) per 20 ms in a fixed location of a superframe.

The BCH is divided into a primary BCH (PBCH) and a secondary BCH (SBCH). The PBCH can transmit network common information while the SBCH can transmit cell specific information. The base station can transmit update information of each system information block through the BCH, and can provide scheduling information so that the mobile station receives updated broadcast information. In this case, there may be provided a plurality of system information blocks, and the system information blocks may be regarded as a bundle of system information that can be transmitted at different cycles in accordance with a procedure.

Accordingly, this embodiment suggests that a field indicating the presence of system information update is added to a paging message, instead of a broadcast control pointer information element according to the related art, wherein the broadcast control pointer information element indicates a location of a frame where system information is transmitted. This field will be referred to as a system information update indication (SIUI) field in the present invention. An example of this system information update indication field included in the paging message will be described with reference to Table 6.

TABLE 6

| Syntax | Size (bit) | Notes |
|---|---|---|
| MOB_PAG-ADV_Message_format ( ){ | — | — |
| Management Message Type = 61 | 8 | — |
| Num_Paging_Group_IDs | 8 | Ð |
| For(i=0; i<Num_Paging_Group_IDs; i++){ | — | — |
| Paging Group ID | 16 | — |
| } | — | — |
| System information update indicationÐ | 1 | Set to 1 if information transmitted through BCH is changed.Ð |
| Num_MACs | 8 | Number of MS MAC addresses |
| For(j=0; j<Num_MACs; j++){ | — | — |
| MS MAC Address hash | 24 | The hash is obtained by computing a CRC24 on the MS 48-bit MAC address. The polynomial for the calculation is 0x1864CFB |
| Action Code | 2 | Paging action instruction to MS0b00 = No action required0b01 = Perform ranging to establish location and acknowledge message0b10 = Enter network0b11 = reservedÐ |
| ReservedÐ } | 5 | — |
| Padding | Variable | Padding bits to ensure octet aligned |
| TLV Encoded Information } | Variable Ð | TLV-specific Ð |

Referring to Table 6, the SIUI field can be set to a size of 1 bit. The mobile station which has received the paging message including the SIUI field set to '1' can receive the BCH from a superframe header (SFH) by waking up at the first subframe of next superframe to receive system information regardless of the paging interval. This will be described with reference to FIG. 8.

Figure 8:
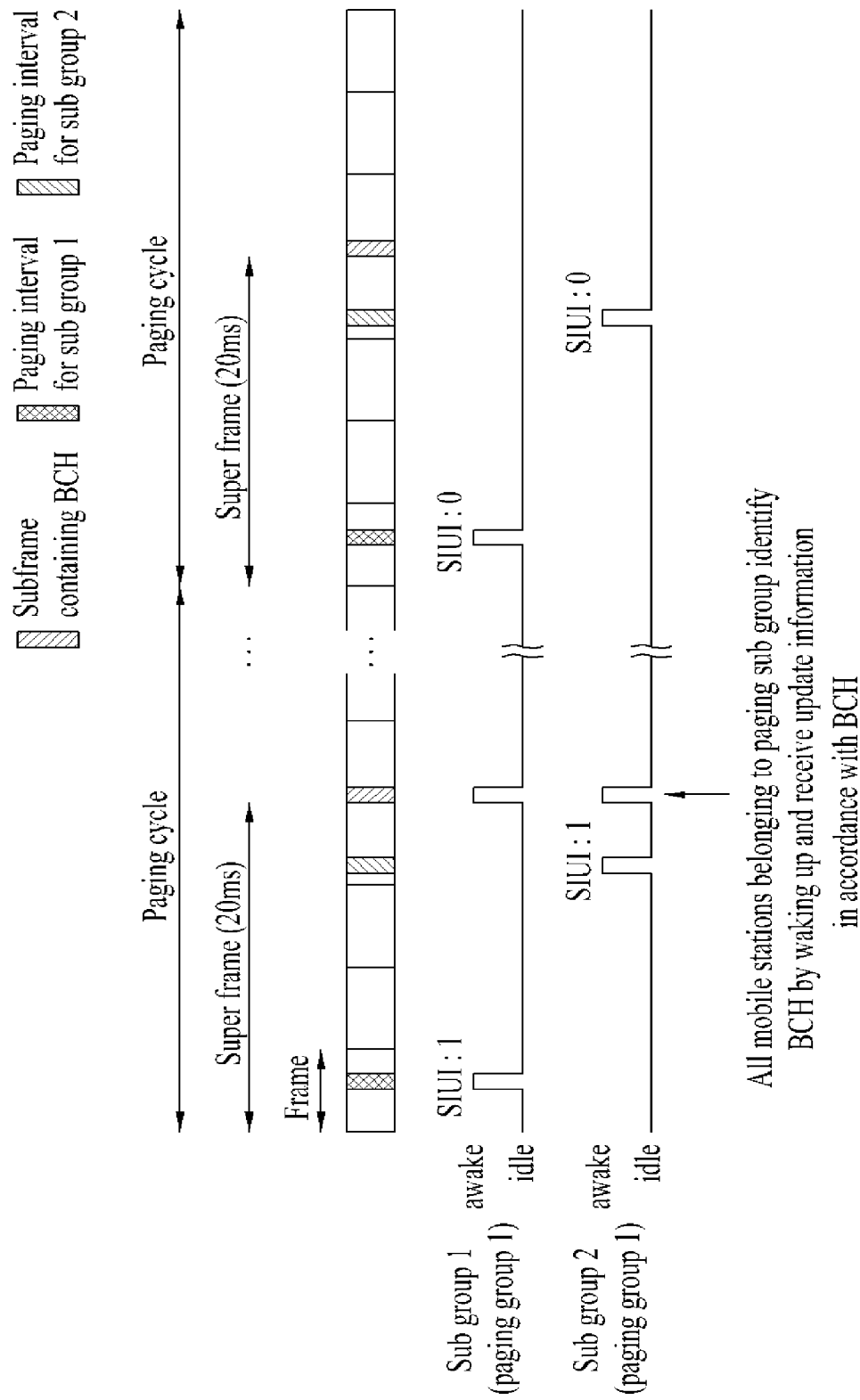
FIG. 8 is a diagram illustrating an example of a method for updating system information of a mobile station which is in an idle mode in accordance with one embodiment of the present invention.

FIG. 8 is a diagram illustrating an example of a method for updating system information of a mobile station which is in an idle mode in accordance with one embodiment of the present invention.

Referring to FIG. 8, it is assumed that two different paging sub groups (paging sub group 1 and paging sub group 2) exist in the same paging group. It is also assumed that a paging subframe of the paging sub group 1 is a arbitrary subframe of the first frame of the paging cycle, and a paging subframe of the paging sub group 2 is a arbitrary subframe of the fourth frame. At this time, the paging message including the SIUI field set to '1' can be transmitted at each paging subframe of the paging sub group 1 and the paging sub group 2. As a result, all mobile stations belonging to each paging sub group can update system information by waking up at the first subframe of next superframe of a superframe where the paging message is transmitted and receiving the BCH.

If the SIUI field of the paging message transmitted to the paging subframe of each paging sub group is set to '0' all mobile stations of each paging sub group can know that there is no update of system information, and can continuously be operated in the idle mode.

Meanwhile, according to this embodiment, even though the mobile station fails to decode the BCH, since the time when next BCH is transmitted is always fixed, the mobile station does not need to stay up. Namely, even the mobile station fails to decode the BCH, the mobile station is operated in the idle mode and then again wakes up after 20 ms to receive the BCH. Also, the mobile station which has successfully decoded the BCH can wake up at a subframe other than the paging subframe to receive updated system information in accordance with information provided from the BCH.

2. Paging Method Limiting Paging Subframe Using Subfrmae Including BCH

In the current wireless communication system, for example, the system subject to the IEEE 802.16m standard, one superframe has a length of 20 ms, and each superframe which is transmitted includes a superframe header (SFH). The superframe header includes a synchronous channel (SCH) and a broadcast channel (BCH). The BCH is a channel that transmits broadcast information, and can be divided into a PBCH and a SBCH. System information is also broadcast information, and can be transmitted to the mobile station through the BCH. Accordingly, if a mobile station which is in an idle mode wakes up at only a subframe where the BCH is transmitted, the mobile station can be operated more efficiently.

2-1. Paging Channel of Subframe Including BCH

According to this embodiment, a method for transmitting a paging message at an SFH or a subframe where the SFH is transmitted, to a mobile station through a paging channel (PCH) that can include a paging message will be described.

Figure 9:
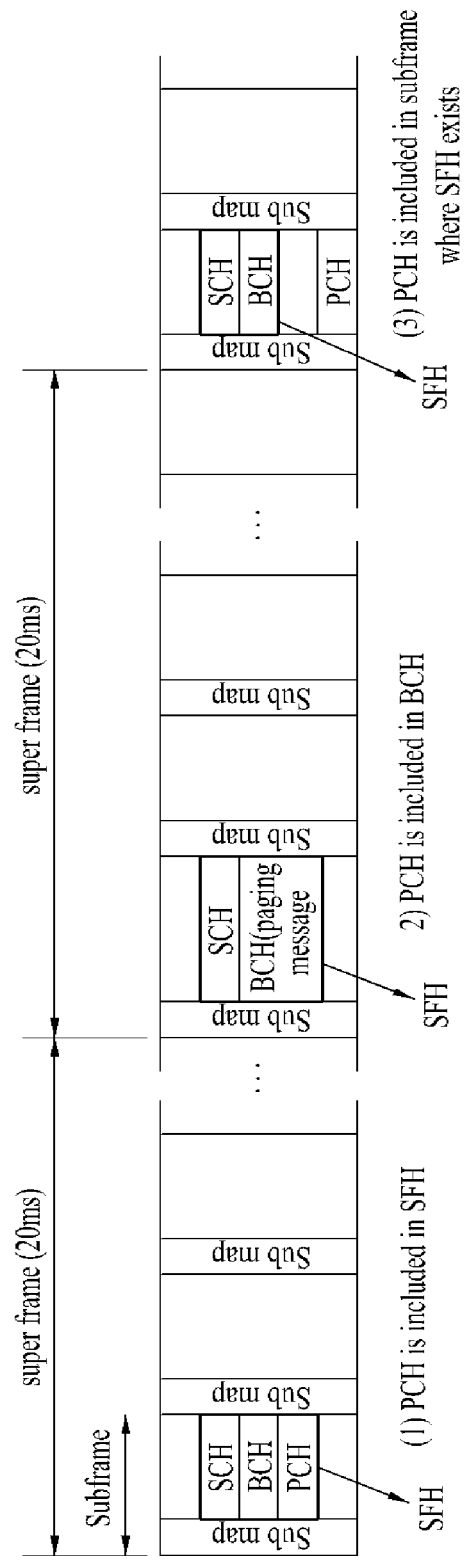
FIG. 9 is a diagram illustrating a location where a paging channel can be transmitted in accordance with another embodiment of the present invention.

FIG. 9 is a diagram illustrating a location where a paging channel can be transmitted in accordance with another embodiment of the present invention.

The paging channel can be included in the SFH as illustrated in FIG. 9(*a*) or the BCH as illustrated in FIG. 9(*b*). Also, the paging channel may be included in a predetermined location within a subframe where the SFH is transmitted, and may be transmitted to one of sub-packets of a secondary superframe header (SSFH).

Figure 10:
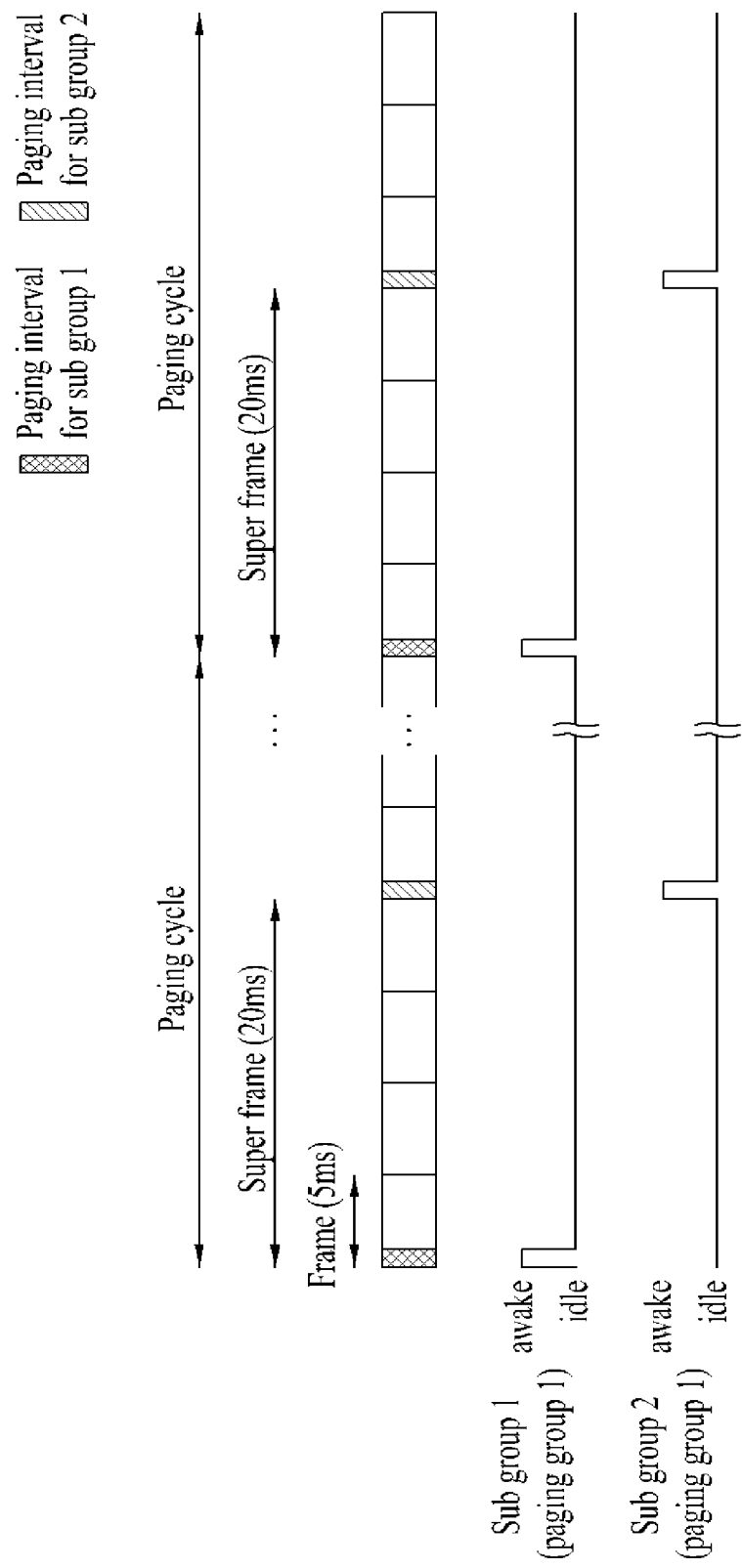
FIG. 10 is a diagram illustrating a paging interval when a paging message is transmitted through a paging channel according to another embodiment of the present invention.

FIG. 10 is a diagram illustrating a paging interval when a paging message is transmitted through a paging channel according to another embodiment of the present invention.

It is assumed that two different paging sub groups (paging sub group 1 and paging sub group 2) exist. As described above, it is preferable that a paging subframe is differently established per paging sub group, and may be a subframe where the BCH is transmitted. Accordingly, the paging subframes can be established as the first subframes of different superframes per paging sub group.

For example, as illustrated in FIG. 10, in case of the paging sub group 1, the paging subframe can be established as the first subframe of the first superframe of the paging cycle. Also, in case of the paging sub group 2, the paging subframe can be established as the first subframe of the second superframe of the paging cycle.

2-2. Transmission of Paging Indication Bit from Subframe Including BCH

In another aspect of this embodiment, a paging indication (PI) bit or field indicating whether the paging message is transmitted can be only transmitted at the subframe where the BCH is transmitted, and the paging message can be transmitted at another subframe. The paging indication bit may have a length of 1 bit or multi-bits as occasion demands. For example, when a plurality of paging sub groups exist, one bit can be allocated to each paging sub group. The mobile station can receive the paging message only if a paging indication bit allocated to its paging sub group is set to '1'.

Figure 11:
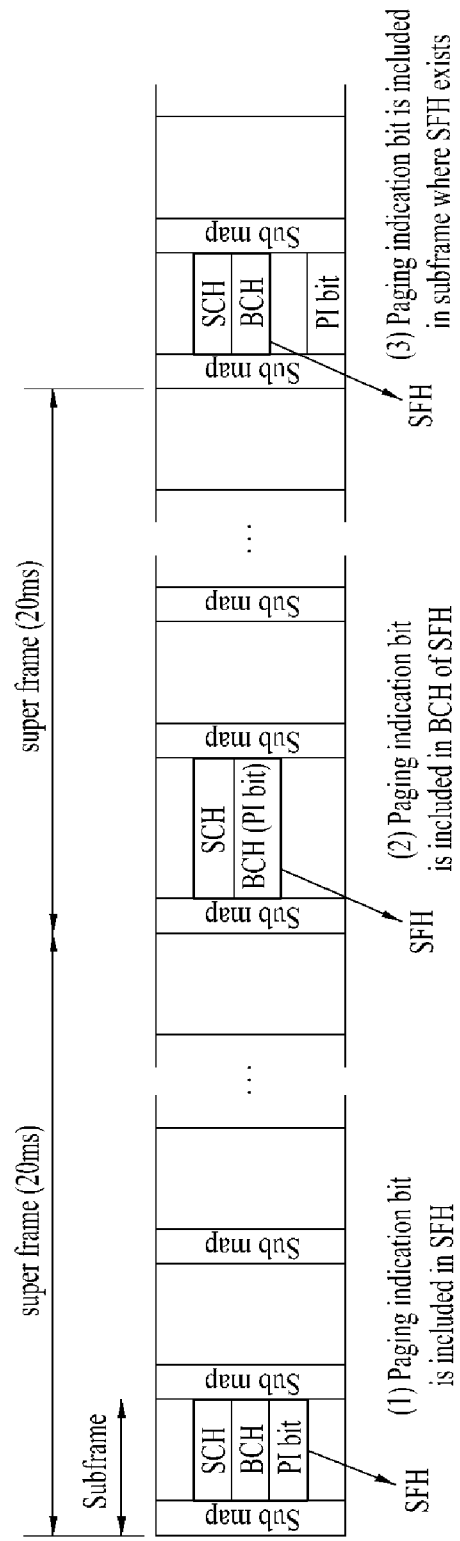
FIG. 11 is a diagram illustrating a location where a paging indication bit in accordance with another embodiment of the present invention is transmitted.

FIG. 11 is a diagram illustrating a location where a paging indication bit in accordance with another embodiment of the present invention is transmitted.

The paging indication bit may be included in the SFH as illustrated in FIG. 11(*a*) or the BCH as illustrated in FIG. 11(*b*). Also, the paging indication bit may be included in a predetermined location within the subframe where the SFH is transmitted, as illustrated in FIG. 11(*c*), or may be transmitted to one of sub-packets of a secondary superframe header (SSFH).

Hereinafter, a location of a paging message that can be transmitted as a paging indication bit is set to '1' and a method for notifying a mobile station of the location of the paging message will be described.

2-2-1. Method for Notifying a Location where a Paging Message is Transmitted

If a paging indication bit of a paging sub group to which the mobile station belongs is set to '1', the mobile station should know the time when the paging message is transmitted and/or a location where the paging message is transmitted, so as to receive the paging message. Also, the mobile station is operated in the idle mode until it reaches the location where the paging message is transmitted, whereby the power can be saved efficiently.

Figure 12:
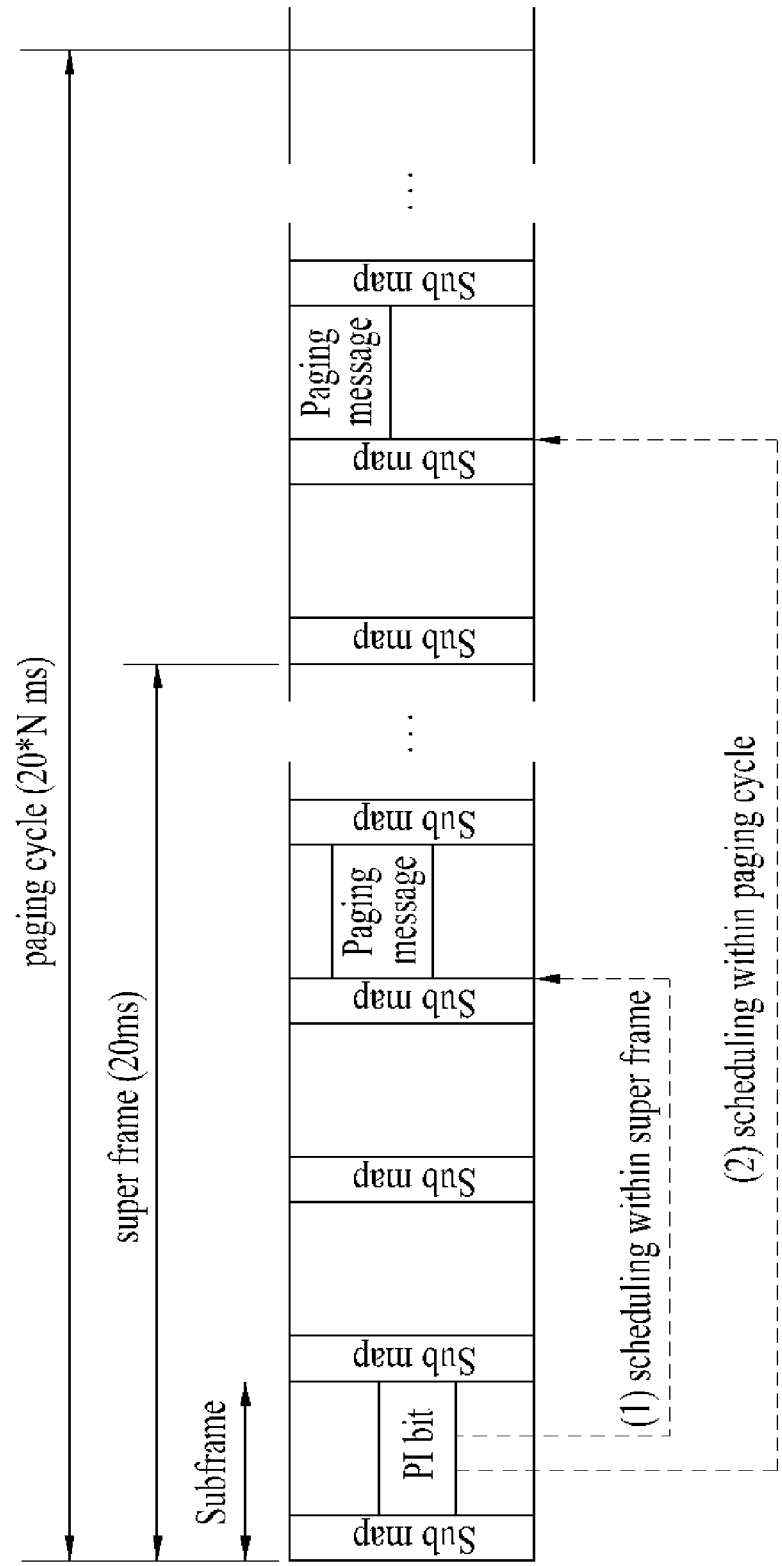
FIG. 12 is a diagram illustrating a location where a paging message is transmitted according to another embodiment of the present invention.

FIG. 12 is a diagram illustrating a location where a paging message is transmitted according to another embodiment of the present invention.

In a subframe including a superframe, it is assumed that a paging indication bit of a specific paging sub group is set to '1' and is located to any one of locations described with reference to FIG. 11. At this time, a paging message of the specific paging sub group may be included in the same superframe as that where the paging indication bit is transmitted as illustrated in FIG. 12, or may be included in another superframe within the same paging cycle. This will be described in more detail with reference to FIG. 13 and FIG. 14.

Figure 13:
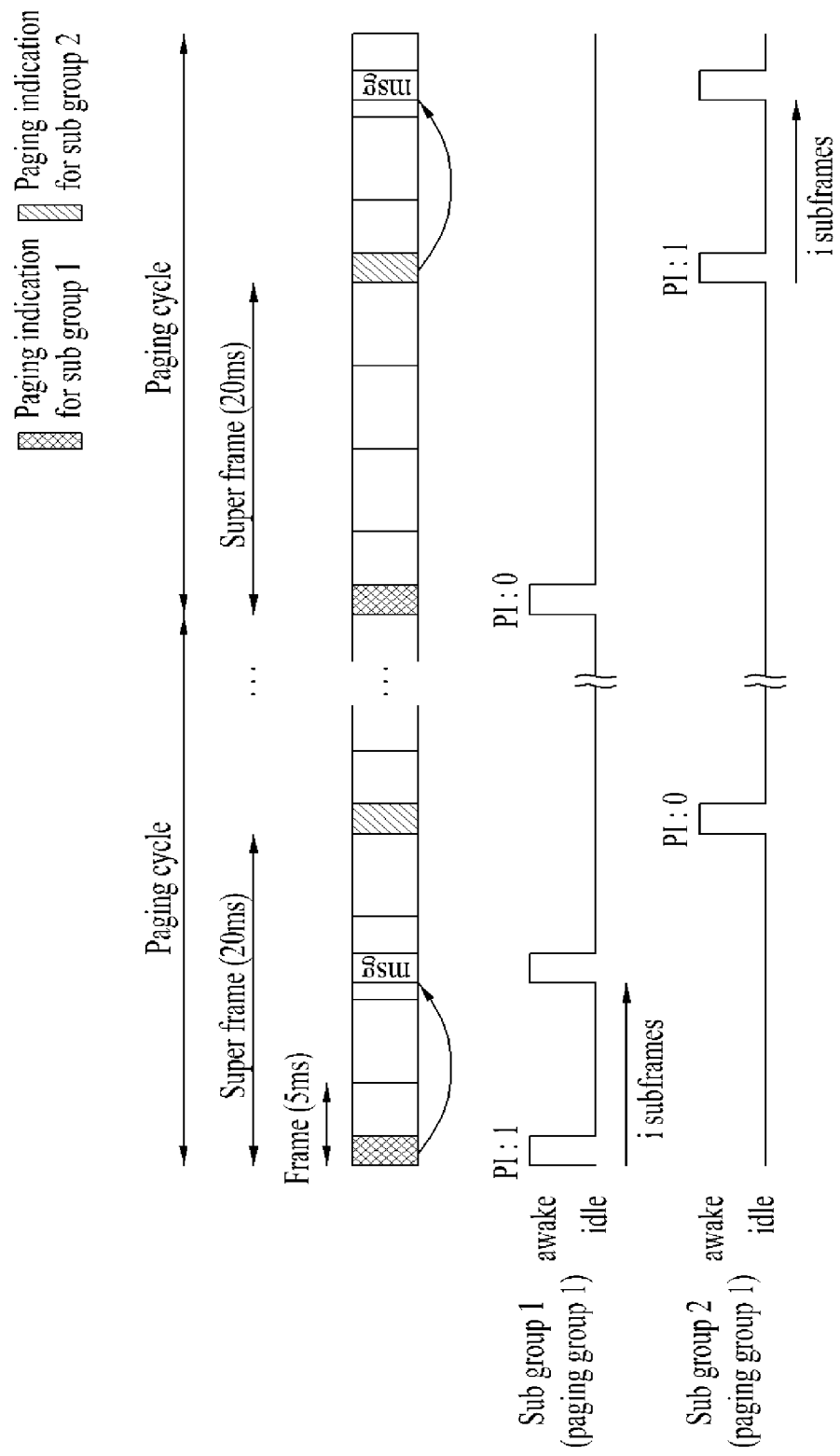
FIG. 13 is a diagram illustrating an example of a location where a paging message is transmitted if paging indication bits are transmitted at different times per paging sub group in accordance with another embodiment of the present invention.

FIG. 13 is a diagram illustrating an example of a location where a paging message is transmitted if paging indication bits are transmitted at different times per paging sub group according to another embodiment of the present invention.

Referring to FIG. 13, it is assumed that two different paging sub groups (paging sub group 1 and paging sub group 2) exist and paging indication bits of respective paging sub groups are respectively transmitted through the first subframes of different superframes. At this time, the paging message of each paging sub group is transmitted after a predetermined time, for example, i(i≥1) subframes, from the subframe where the paging indication bit is transmitted.

Next, a case where a plurality of paging sub groups exist and paging indication bits of respective paging sub groups are transmitted at the same time will be described.

The paging indication bits may have a bitmap type to simultaneously notify the mobile stations of the respective paging sub groups whether the paging message of each of the plurality of paging sub groups is transmitted. For example, if the paging messages of the paging sub group 1 and the paging sub group 2 are only transmitted, the paging indication bits of the paging groups are arranged starting from the most significant bit (MSB) of the bitmap in the order from the first paging sub group to the last paging sub group, thereby having a type of '110 . . . 0'. The location where the paging message is transmitted when this bitmap is used will be described with reference to FIG. 14.

Figure 14:
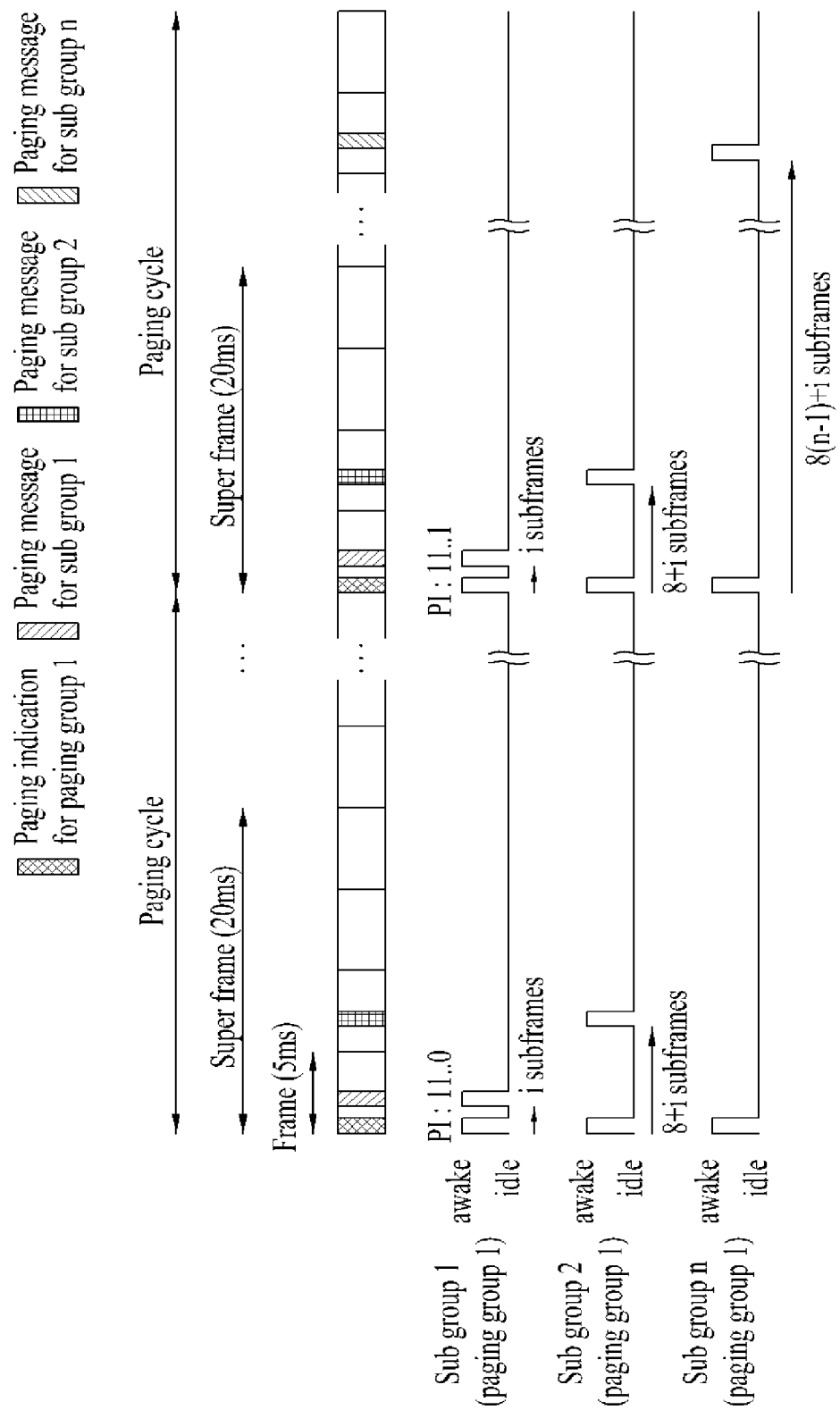
FIG. 14 is a diagram illustrating an example of a location where a paging message is transmitted if paging indication bits of a plurality of paging sub groups are transmitted at the same time in accordance with another embodiment of the present invention.

FIG. 14 is a diagram illustrating an example of a location where a paging message is transmitted if paging indication bits of a plurality of paging sub groups are transmitted at the same time according to another embodiment of the present invention.

In FIG. 14, it is assumed that N paging sub groups (paging sub group 1, paging sub group 2, . . . paging sub group N) exist. It is also assumed that paging indication bits indicating whether the paging message of each paging sub group is transmitted are transmitted through the first subframe of each paging cycle.

If the paging indication bit is set to '110 . . . 0' in the first subframe of the first paging cycle, it represents that only the paging messages for the paging sub group 1 and the paging sub group 2 are transmitted. In this case, the subframe where the paging message of the paging sub group having the paging indication bit set to 1 is transmitted can be determined using a number of the paging sub group (i.e., paging sub group ID). Namely, the paging message of the paging sub group 1 can be transmitted from the ith subframe of the subframes where the paging indication bit is transmitted. Also, the paging message of the paging sub group 2 can be transmitted from the i+8th subframe of the subframes where the paging indication bit is transmitted.

If the paging indication bit is set to '11 . . . 1' as illustrated in the second paging cycle of FIG. 14, in case of the paging sub group N, the paging indication bit can be transmitted from the i+8(N−1)th subframe of the subframes where the paging indication bit is transmitted. In this case, the transmission intervals of the paging message are spaced apart from each other by 8 subframes whenever the paging sub group increases by 1. However, the transmission intervals are only exemplary and may be modified if necessary.

As described above, although the location where the paging message of the paging indication bit is transmitted may be defined in accordance with a previously determined rule, the location where the paging message is transmitted may be defined through predetermined signaling. For example, information of the location where the paging message is transmitted can be transmitted together with the paging indication bit.

2-2-2. Method for Setting a Paging Indication Bit

Hereinafter, a method for setting a paging indication bit in accordance with various sizes and formats will be described.

2-2-2-1. 1 Bit Paging Indication Method

If a 1 bit paging indication method is used, whether a paging message of one paging sub group is transmitted can be identified per superframe. Accordingly, if the paging indication bit is transmitted through any one of the locations described with reference to FIG. 11, it is preferable that the paging indication bit is transmitted through different superframes per paging sub group. This will be described with reference to FIG. 15.

Figure 15:
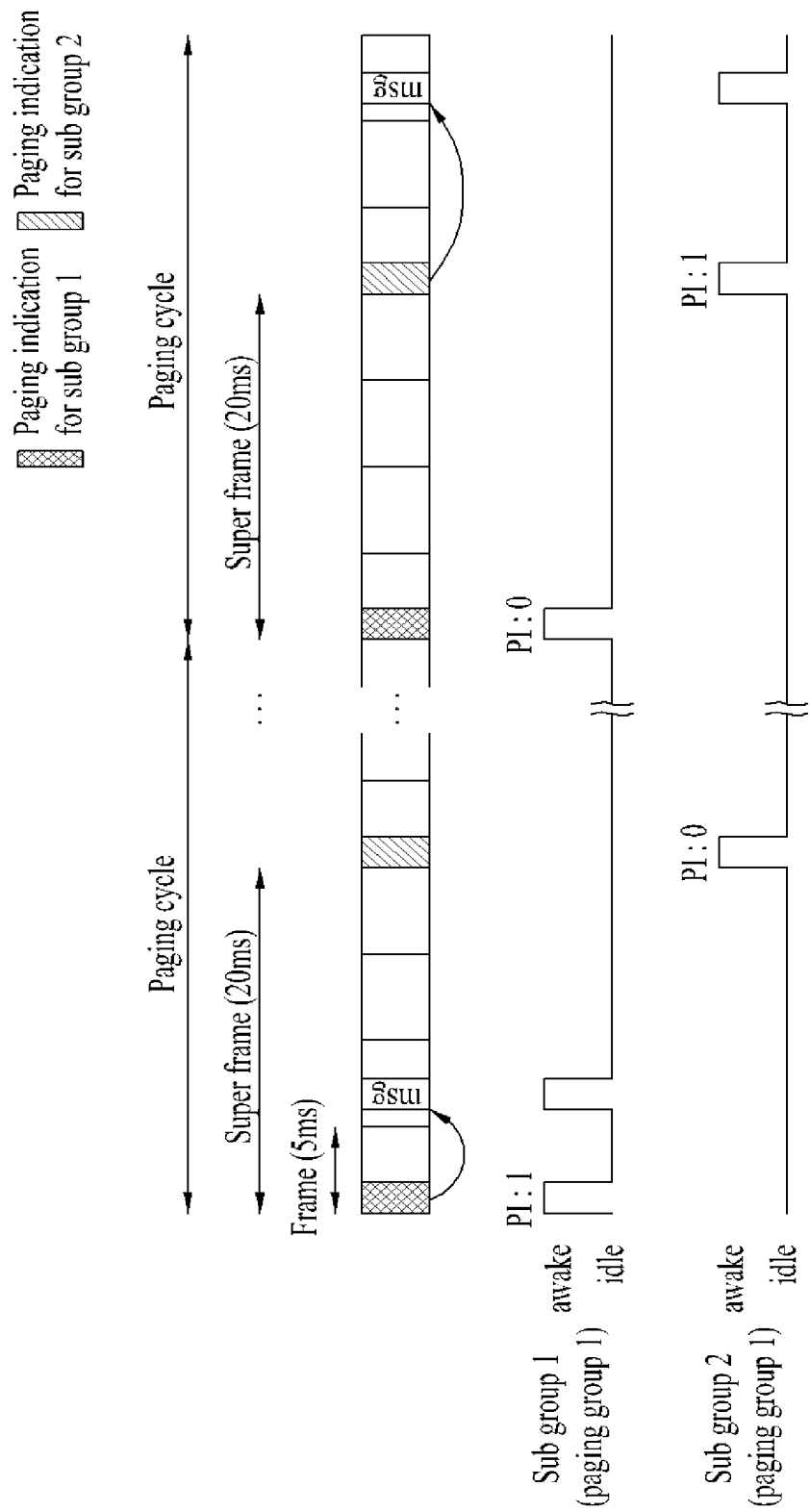
FIG. 15 is a diagram illustrating an example of a 1 bit paging indication method in accordance with another embodiment of the present invention.

FIG. 15 is a diagram illustrating an example of a 1 bit paging indication method in accordance with another embodiment of the present invention.

Referring to FIG. 15, a paging indication bit of the paging sub group 1 can be transmitted from the first superframe of the paging cycle, and a paging indication bit of the paging sub group 2 can be transmitted from the second superframe of the paging cycle. All mobile stations belonging to each paging sub group can wake up to receive the paging message only if the paging indication bit of the paging sub group to which the mobile stations belong is set to 1. It is preferable that the as any one of the locations described with reference to FIG. 11 is designated as the location where the paging indication bit is transmitted. Also, the location where the paging indication bit is transmitted can be designated through one of the methods described in 2-2-1.

2-2-2-2. n Bit Paging Indication Method

In this embodiment, paging intervals for receiving paging indication (PI) in all mobile stations belonging to the same paging group can be established equally. Also, in this embodiment, paging information that includes paging cycle, paging offset, paging interval length and paging sub group number can be broadcasted through system information. This will be described with reference to Table 7.

Table 7 illustrates an example that paging information related to another embodiment of the present invention is broadcasted through system information.

TABLE 7

| TypeÐ | LengthÐ | ValueÐ | Scope Ð |
|---|---|---|---|
| xxxÐ | xÐ | PAGING_CYCLE PAGING_OFFSETPaging Interval LengthPaging-group-ID Paging sub group number: the number of paging sub groups belonging to paging group | RNG-RSPDREG-CMDSystem Information(BCH)Ð |

Referring to Table 7, paging information transferred to the mobile station through the ranging response message or the deregistration command message in the general wireless communication system can be included in the system information so that the information can be transmitted to the mobile station through the BCH. Also, the paging information can further include information of the number of paging sub groups.

In this way, all mobile stations can identify the paging subframe where paging indication (PI) is transmitted, through the broadcasted paging information. Accordingly, each mobile station belonging to each paging sub group can identify paging indication of its paging sub group number, and can receive the paging message through any one of the methods described in 2-2-1 if the paging message of its paging sub group is transmitted.

Also, in this embodiment, paging indication (PI) indicating whether the paging message of the mobile station belonging to each paging sub group is transmitted can have an n-bit bitmap type. This will be described with reference to FIG. 16.

Figure 16:
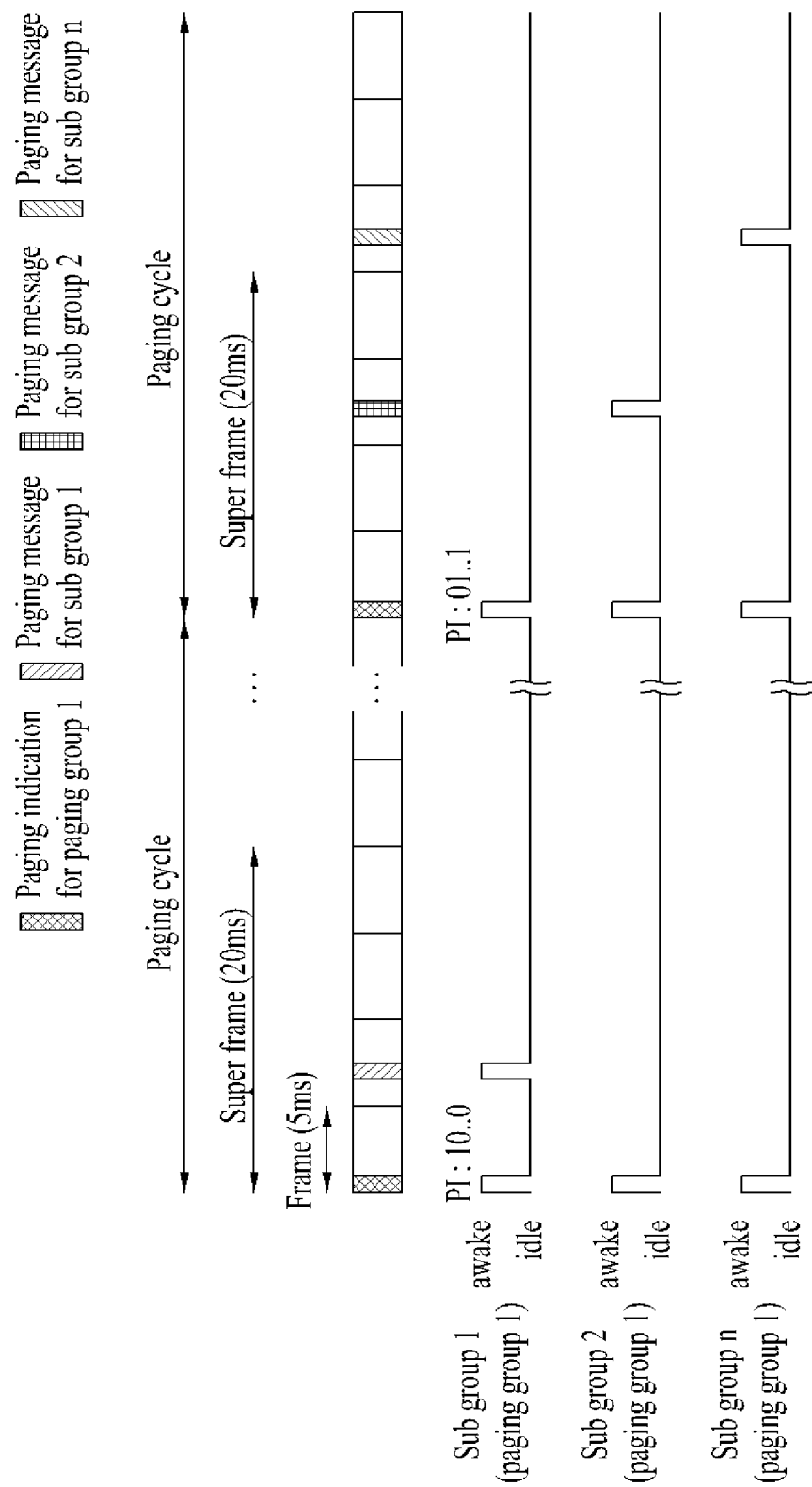
FIG. 16 is a diagram illustrating a method for transmitting a paging message using bitmap type paging indication in accordance with another embodiment of the present invention.

FIG. 16 is a diagram illustrating a method for transmitting a paging message using bitmap type paging indication in accordance with another embodiment of the present invention.

In FIG. 16, it is assumed that N paging sub groups exist and N-bit paging indication is transmitted to the mobile stations, which belong to each paging sub group, through the first subframe of each paging cycle. It is also assumed that the location where the paging message of each paging sub group is designated through any one of the methods described in 2-2-1.

In the first paging cycle, a paging indication bitmap of '10 . . . 0' indicating that the paging message of the paging sub group 1 is only transmitted is transmitted to each paging sub group. As a result, all mobile stations belonging to the paging sub group 1 can receive the paging message by waking up in the previously determined location.

In the second paging cycle, a paging indication bitmap of '010 . . . 1' indicating that the paging messages of the paging sub group 2 and the paging sub group N are transmitted is transmitted to each paging sub group. As a result, the mobile stations belonging to the paging sub group 2 and the paging sub group N can receive the paging message by waking up at the time when the paging message of the corresponding paging sub group is transmitted.

2-2-2-3. Grouping Method of n Bit Paging Indication

According to the aforementioned n-bit bitmap paging indication method using a bitmap of multi-bits, mobile stations belonging to all paging sub groups of one paging group can identify paging indication by waking up at the same paging interval. However, if paging subframes where the paging indication using the multi-bit bitmap is transmitted are also grouped, all the mobile stations of the paging group may not wake up at the same time.

In this embodiment, N paging sub groups belonging to one paging group can be divided into M paging indication groups. Namely, mobile stations belonging to N/M paging sub groups can simultaneously identify paging indication (PI) of N/M-bit size by waking up at the same paging interval (listening interval). In this case, N is divided by M when N is a multiple of M and the paging sub groups are allocated to the paging indication group at the same rate. However, the paging indication groups method can be used even though the paging sub groups are not allocated to the paging indication group at the same rate.

The mobile stations of each paging group can wake up at the paging subframe determined per paging sub group to receive the paging message only if paging indication of the paging sub groups to which the mobile stations of each paging group belong is set. This will be described with reference to FIG. 17.

Figure 17:
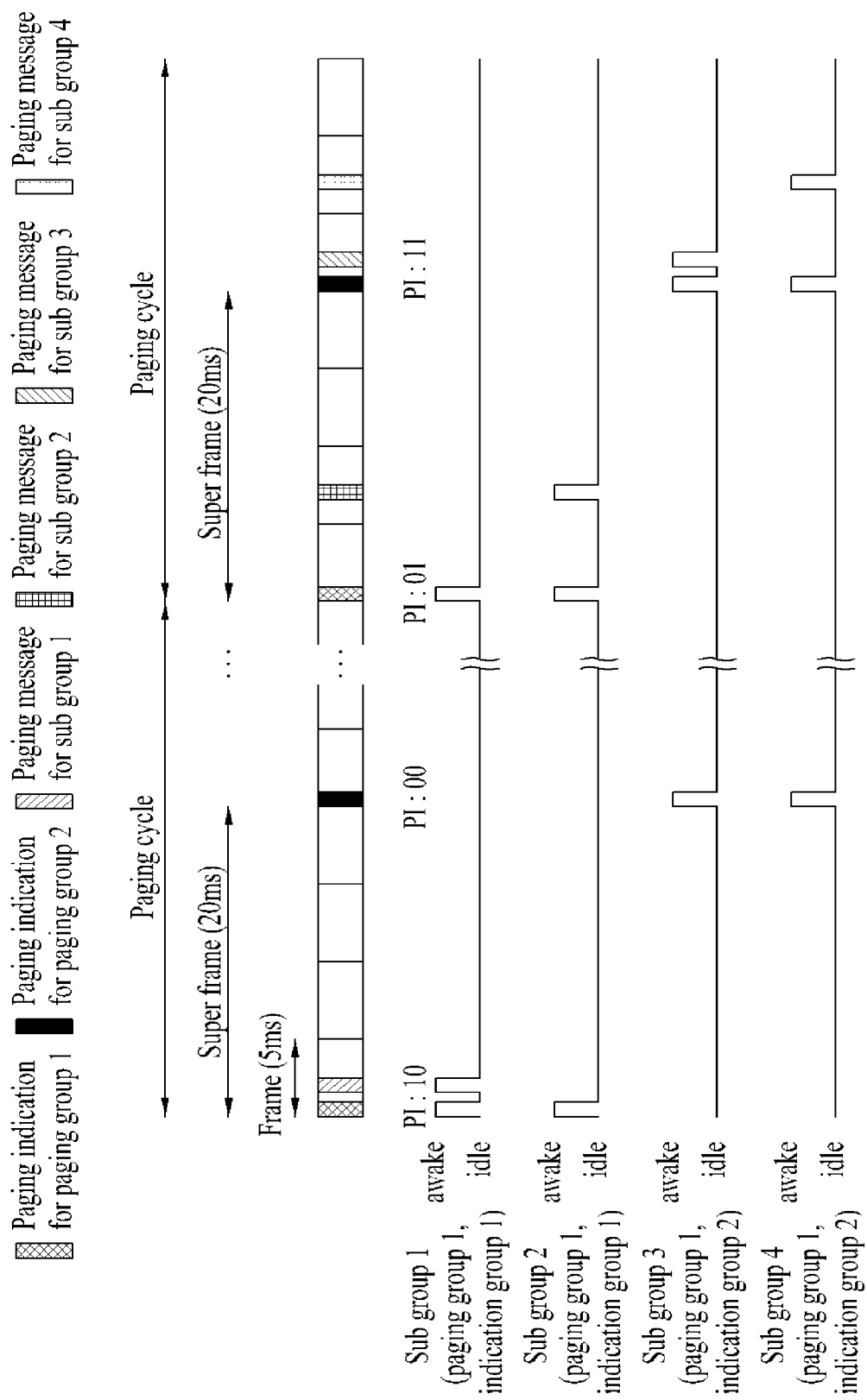
FIG. 17 is a diagram illustrating an example that a paging indication grouping method in accordance with another embodiment of the present invention is used.

FIG. 17 is a diagram illustrating an example that a paging indication grouping method in accordance with another embodiment of the present invention is used.

Referring to FIG. 17, one paging group is divided into four paging sub groups, wherein the paging sub groups 1 and 2 are included in the paging indication group 1 and the paging sub groups 3 and 4 are included in the paging indication group 2. In this case, paging indication of each paging indication group can be transmitted through the first subframes of different superframes. The mobile stations of the paging sub groups belonging to the same paging indication group can be established to have the same paging interval (or listening interval). Namely, supposing that the paging sub groups 1 and 2 belong to the paging indication group 1 and the paging sub groups 3 and 4 belong to the paging indication group 2, the mobile stations of the idle mode, which belong to each paging indication group, identify the same paging indication bit with the same listening interval.

In this case, the paging interval or the listening interval could be a superframe unit, and the mobile stations of the idle mode can identify the paging indication bit at the SFH which corresponds to a start part of the listening interval. Also, the mobile stations of the idle mode can identify the paging indication bit and at the same time receive system information transmitted through the SFH or the subframe including SFH.

Furthermore, the mobile stations of the idle mode may identify the paging indication bit through system information. The mobile stations which have identified the paging indication bit can receive the paging message by waking up at the paging subframe or frame where the paging message of their paging sub group is transmitted, only if the paging indication bit of the paging sub group to which each mobile station of the idle mode belongs is set.

For example, in the first paging cycle of FIG. 17, the paging indication bit of the paging indication group 1 is set to 10 through the first subframe of the first superframe. All mobile stations of the paging sub groups 1 and 2 receive the paging indication bit, and identify whether the paging message is transmitted to the paging sub group to which they belong. Since the paging indication bit is set to 10, the mobile stations belonging to the paging sub group 1 can receive the paging message at the previously determined subframe, and the mobile stations belonging to the paging sub group 2 continue to be operated in the idle mode.

The mobile stations of the paging sub groups 3 and 4 belonging to the paging indication group 2 can receive the paging indication bit of the paging indication group 2 from the first subframe of the second superframe of the first paging cycle. Since the paging indication bit of the paging indication group 2 is set to 00, the mobile stations belonging to the paging indication group 2 can identify that the paging message is not transmitted, and can continuously be operated in the idle mode.

In case of the second paging cycle, since the paging indication bit of the paging indication group 2 is 01 in the first subframe, only the mobile stations belonging to the paging sub group 2 can receive the paging message at the previously determined paging subframe. The mobile stations belonging to the paging sub groups 3 and 4 of the paging indication group 2 can receive the paging indication bit of the paging indication group 2 from the first subframe of the second superframe of the first paging cycle. Since the paging indication bit of the paging indication group 2 is set to 11, all the mobile stations belonging to the paging indication group 2 can receive the paging message from the paging subframe previously established for each paging sub group.

Figure 18:
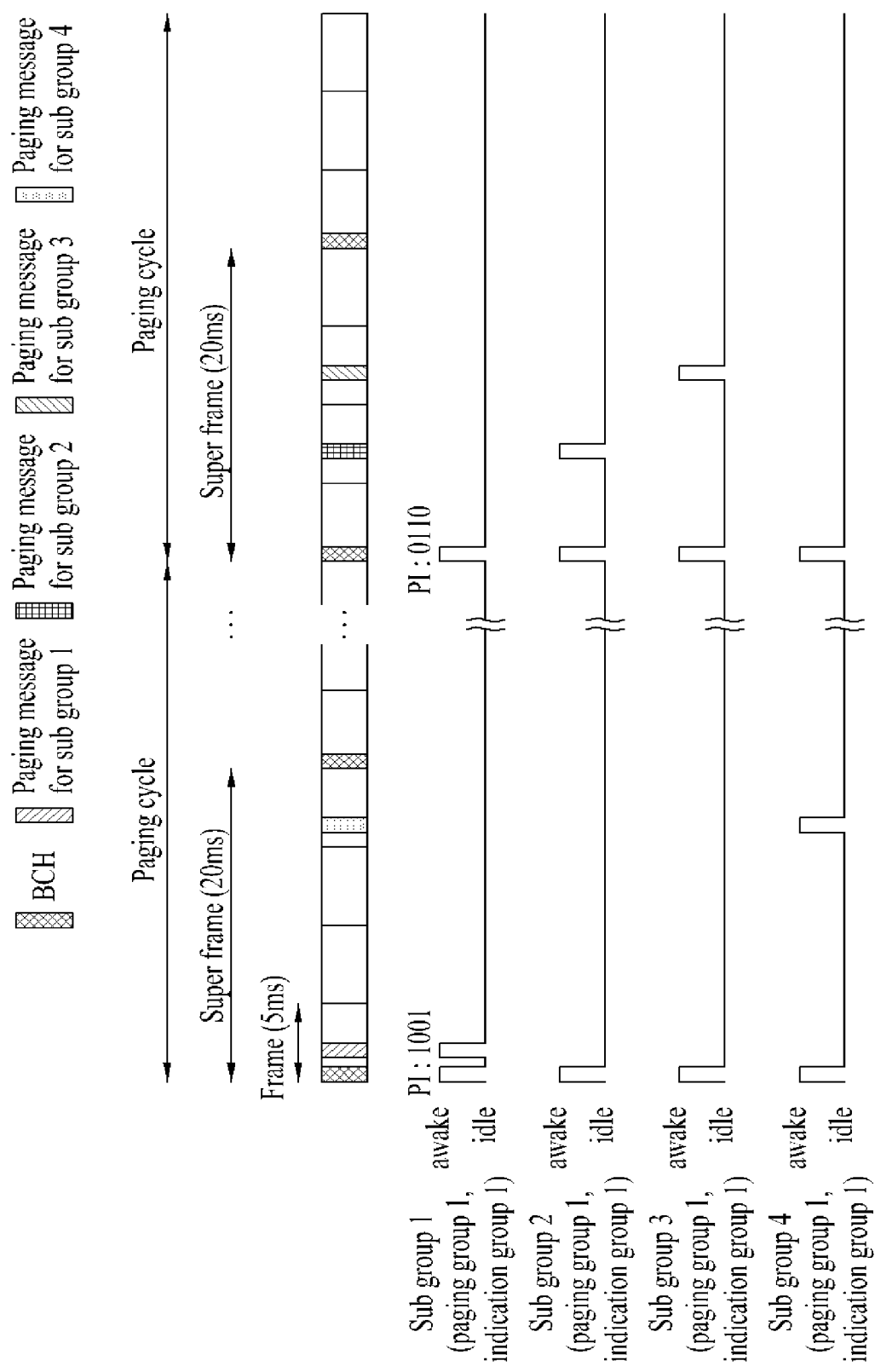
FIG. 18 is a diagram illustrating another example that paging indication grouping method in accordance with another embodiment of the present invention is used.

FIG. 18 is a diagram illustrating another example that paging indication grouping method in accordance with another embodiment of the present invention is used.

As illustrated in FIG. 18, if four paging sub groups exist within the paging group, the paging message of each paging sub group can be allocated one by one in a frame unit within one superframe. Namely, if the four paging sub groups belong to one paging indication group, the paging message of each paging sub group can be allocated either one by one in due order per frame or through modulo operation.

2-2-2-4. Method for Transmitting a Paging Indication Bit Map Through SSFH

In the IEEE 802.16m system, the SFH is divided into a primary superframe header (PSFH) and a secondary superframe header (SSFH). Although the PSFH is transmitted per superframe, the SSFH may not be transmitted per superframe. Information transmitted through the SSFH is divided into different sub-packets and then can be included in the SSFH. According to this embodiment, a method for transmitting a paging indicator having a similar function to that of the aforementioned paging indication bit through S-SFH SP5 IE (Paging Sub-Packet IE) that can be used to transfer paging information will be disclosed.

Hereinafter, contents that can be included in the S-SFH SP5 IE will be described with reference to Table 8 to Table 10. In Table 8 to Table 10, it is assumed that four paging sub groups exist per paging group.

First of all, Table 8 illustrates an example of contents that can be included in the S-SFH SP5 IE in accordance with another embodiment of the present invention.

TABLE 8

| Syntax | Size (bit) | Notes |
|---|---|---|
| S-SFH SP5 IE format ( ) { | Ð | Ð |
| N_PGID | 3 | Number of PGIDs in the sub-packets |
| PGID List | 16 * N_PGID | List of Paging group IDs |
| For (i=0;i<N_PGID; i++){ | Ð | Ð |
| Paging group ID | TBD | Ð |
| Paging indicator | 4 | Ð |
| } | Ð | Ð |
| } | Ð | Ð |

Referring to Table 8, since four paging sub groups are included in one paging ID, a paging indicator field is established to have a size of four bits.

Table 9 illustrates another example of contents that can be included in the S-SFH SP5 IE in accordance with another embodiment of the present invention.

TABLE 9

| Syntax | Size (bit) | Notes |
|---|---|---|
| S-SFH SP5 IE format ( ) { | Ð | Ð |
| N_PGID | 3 | Number of PGIDs in the sub-packets |
| Paging Indicator Usage Flag | 1 | 0b = 1 Paging indicator bitmap is present0b = 0 paging indicator bitmap is absent |
| PGID List | 16 * N_PGID | List of Paging group IDs |
| If( Paging Indicator Usage Flag ==1) { | Ð | Ð |
| For (i=0;i<N_PGID; i++){ | Ð | Ð |
| Paging group ID | TBD | Ð |
| Paging indicator | 4 | Ð |
| } | Ð | Ð |
| } | Ð | Ð |
| } | Ð | Ð |

Referring to Table 9, a Paging Indicator Usage Flag field is set to 0 when the paging messages of all paging groups transmitted within the corresponding superframe are not transmitted at all.

Table 10 illustrates other example of contents that can be included in the S-SFH SP5 IE in accordance with another embodiment of the present invention.

TABLE 10

| Syntax | Size (bit) | Notes |
|---|---|---|
| S-SFH SP5 IE format ( ) { | Ð | Ð |
| N_PGID | 3 | Number of PGIDs in the sub-packets |
| PGID List | 16 * N_PGID | List of Paging group IDs |
|  | Ð |  |
| For (i=0; i<N_PGID; i++){ | Ð | Ð |
| Paging Indicator Usage Flag | 1 | 0b = 1 Paging indicator bitmap is present0b = 0 paging indicator bitmap is absent |

TABLE 10-continued

| Syntax | Size (bit) | Notes |
|---|---|---|
| If( Paging Indicator Usage Flag ==1) { | Ð | Ð |
| Paging group ID | TBD | Ð |
| Paging indicator | 4 | Ð |
| } | Ð | Ð |
| } | Ð | Ð |
| } | Ð | Ð |

Referring to Table 10, unlike Table 9, a paging indicator usage flag can respectively be applied to each paging group instead of all paging groups transmitted within the corresponding superframe.

3. Method for Detecting a Paging Message Using Paging CID

According to still another embodiment, a method for detecting a paging message using paging CID is disclosed, in which decoding overhead of a mobile station can be reduced and the mobile station can detect the paging message more quickly.

In the general wireless communication system, broadcast CID is used to transmit the paging message. However, in this embodiment, a method for transmitting a paging message using paging CID dedicated for the paging message is suggested. In this case, even if one CRC is attached to all sub-maps and the mobile station should perform blind decoding, mobile stations of an idle mode and mobile stations of a normal mode can be operated effectively. Namely, only the mobile stations of the idle mode can receive the message transmitted using the paging CID while the mobile stations of the normal mode do not receive the message transmitted using the paging CID. Accordingly, overall system throughput can be improved and power consumption of the mobile station can be reduced.

Meanwhile, if a blind decoding scheme is used, in this embodiment, a method for transmitting control signaling for a paging message in a fixed location (for example, first location) of a sub-map can be used. Namely, the paging message can be transmitted from a paging subframe using a format of a fixed size in a fixed location of a sub-map. Accordingly, it is possible to reduce decoding overhead that may occur as the mobile station performs blind decoding for all sub-maps to detect control signaling. If the mobile station fails to perform blind decoding for control signaling of a previously set size in a fixed location, it can be determined that there is no paging message in the corresponding paging subframe. Accordingly, the mobile station can enter the idle mode directly without blind decoding for the other sub-map.

Accordingly, in this method, since the mobile station of the idle mode decodes only a part which includes control information of the paging message from the sub-map of the paging subframe, it is effective in saving the power of the mobile station. This will be described with reference to FIG. 19.

Figure 19:
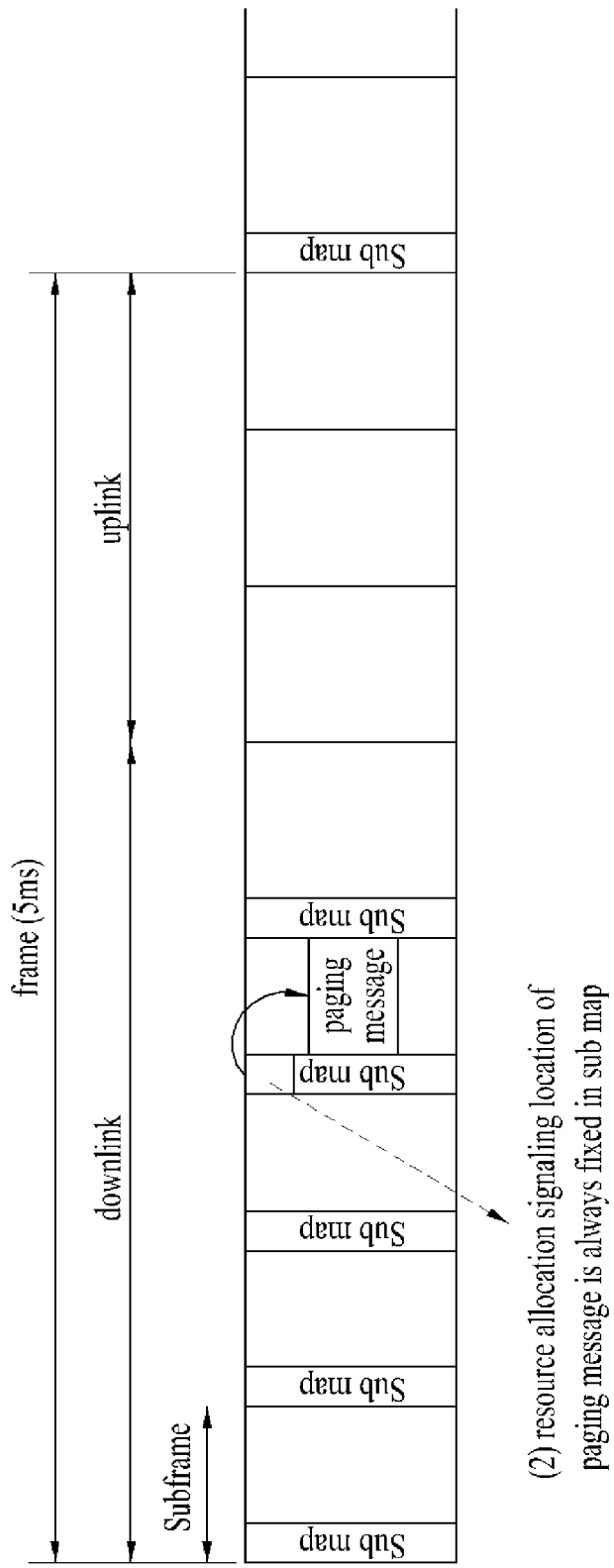
FIG. 19 is a diagram illustrating an example of a location where control signaling for a paging message in accordance with another embodiment of the present invention is transmitted.

FIG. 19 is a diagram illustrating an example of a location where control signaling for a paging message in accordance with another embodiment of the present invention is transmitted.

Referring to FIG. 19, supposing that the fourth subframe is a paging subframe, control signaling of the paging message can be transmitted to the mobile station through a sub-map of the corresponding subframe and is preferably located at the foremost part of the sub-map. In this case, it is efficient in that the mobile station can determine the presence of the paging message by decoding only the foremost part of the sub-map of the paging subframe.

4. Multi-Level Paging Cycle

According to a further embodiment, there is provided a method for establishing a paging cycle (PAGING_CYCLE) value in a multi-level, wherein the paging cycle value is one of parameters related to paging that can be set between the mobile station and the base station.

In case of the mobile station which is not paged for a long time, power consumption and paging overhead can be reduced if the paging cycle of the mobile station increases to a maximum value, which is previously established, through a predetermined level. This will be described with reference to FIG. 20.

Figure 20:
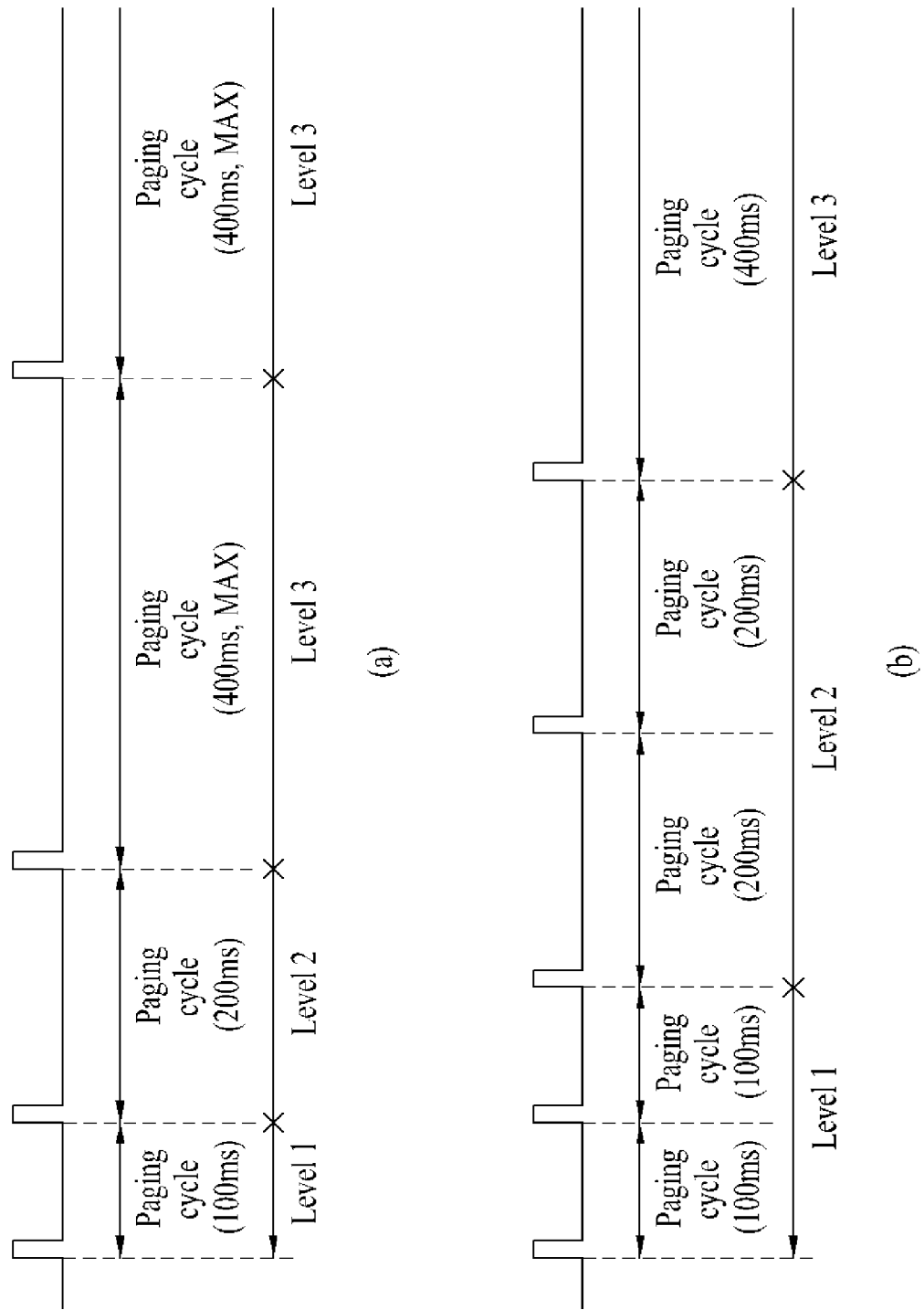
FIG. 20 is a diagram illustrating an example that a paging cycle of a mobile station is determined in a multi-level in accordance with the further embodiment of the present invention.

FIG. 20 is a diagram illustrating an example that a paging cycle of a mobile station is established in a multi-level in accordance with the further embodiment of the present invention.

First of all, as illustrated in FIG. 20(a), the paging cycle of the mobile station is classified into three levels. If the mobile station is not paged for a time corresponding to one level, a time equivalent to twice of a previous level can be established as a paging cycle of next level. At this time, it is assumed that the paging cycle of the first level is 100 ms and the maximum paging cycle is 400 ms corresponding to the third level.

If the mobile station is not paged for the paging interval of the first paging cycle of 100 ms after entering the idle mode, the mobile station performs the operation of the idle mode in a paging cycle of 200 ms of the second level. If the mobile station is not paged for the paging interval even by the paging cycle of the second level, the mobile station performs the operation of the idle mode in a paging cycle of 400 ms of the third level. If the mobile station is not paged for the paging interval even by the paging cycle of the third level, the mobile station performs the operation of the idle mode in a state that the paging cycle of the third level corresponding to the maximum paging cycle is maintained.

Next, if the mobile station is not paged for the twice-repetition interval of the paging cycle of one level as illustrated in FIG. 20(b), the mobile station can be operated in accordance with the paging cycle of next level. Of course, the number of repetition times can be changed in accordance with user s requirements or system status until the paging cycle of one level is converted to that of next level.

The maximum value of the aforementioned paging cycle can be transmitted to the mobile station in a type illustrated in Table 11.

Table 11 illustrates an example of contents included in a message notifying the mobile station of the maximum paging cycle of the multi-level paging cycle in accordance with the further embodiment of the present invention.

message, the paging information may be broadcasted through system information as described in 2-2-2-2.

In this embodiment, the paging cycle increases by a predetermined rate or predetermined value if a paging cycle of a rule previously agreed between the mobile station and the base station, for example, a given time or a given number of times, passes. If the paging cycle reaches the maximum value, the maximum value can be maintained. Also, an increase value and an increase condition of the paging cycle may be established explicitly through a message unicasted between the mobile station and the base station.

As a still further embodiment of the present invention, the mobile station and the base station through which the embodiments of the present invention can be performed will be described with reference to FIG. 5 to FIG. 20.

The mobile station can be operated as a transmitter in the uplink, and can be operated as a receiver in the downlink. Also, the base station can be operated as a receiver in the uplink, and can be operated as a transmitter in the downlink. Namely, the mobile station and the base station can include a transmitter and a receiver to transmit information or data.

The transmitter and the receiver can include processor, module, part, and/or means for performing the embodiments of the present invention. Particularly, the transmitter and the receiver can include a module (means) for encoding a message, a module for decoding the encoded message, and an antenna for transmitting and receiving the message.

The mobile station used in the embodiments of the present invention can include a low power radio frequency (RF)/intermediate frequency (IF) module. Also, the mobile station can include a means, module or part for performing controller function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

The base station can transmit data received from an upper layer to the mobile station by wireless or wire. The base station can include a low power RF/IF module. Also, the base station can include a means, module or part for performing controller function, orthogonal frequency division multiple access (OFDMA) packet scheduling, time division duplex (TDD) packet scheduling and channel multiplexing function, medium access control (MAC) frame variable control function according to service characteristics and radio wave condition, handover function, authentication and encryption

TABLE 11

| Type | LengthÐ | ValueÐ | ScopeÐ |
|---|---|---|---|
| XxxÐ | xÐ | PAGING_CYCLE MAX PAGING_CYCLE: Maximum value of PAGING_CYCLEPAGING_OFFSETPaging Interval LengthPaging-group-IDÐ | RNG-RSPDREG-CMD(System Information)Ð |

Referring to Table 11, the maximum paging cycle (MAX PAGING_CYCLE) value can be added to the paging information that can be used in the general wireless communication system. In this case, it is preferable that the maximum paging cycle value is equal to or greater than a paging cycle (PAGING_CYCLE) parameter value. Although the paging information may be transmitted to the mobile station through the ranging response message or the deregistration command function, packet modulation and demodulation function for data transmission, quick packet channel coding function, and real-time modem control function, thereby performing the aforementioned embodiments of the present invention.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless access systems. Examples of various wireless access systems include 3GPP(3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:

1. A method for receiving a paging message in a mobile station, the method comprising:
   receiving paging information from a serving base station, the paging information including a paging sub group identifier indicating a paging sub group to which the mobile station belongs;
   receiving the paging message for a paging interval of the paging sub group, wherein the paging message includes a system information update indication (SIUI) field; and
   receiving updated system information via a superframe header (SFH) received at a first subframe of a next superframe after the receiving of the paging message including the SIUI field, if the SIUI field indicates a presence of the updated system information,
   wherein the paging sub group is different from a paging group, the paging group is determined by a geographical location, the paging sub group is determined by a mobile station ID, and the paging sub group is maintained while the mobile station is being operated in an idle mode regardless of the geographical location.

2. The method of claim 1, wherein the paging interval is determined in a subframe unit.

3. The method of claim 2, wherein the paging message is transmitted to the mobile station through a downlink resource indicated by control information included in a sub-map of a subframe corresponding to the paging interval, and the control information is CRC masked by a paging connection identifier (CID) for the mobile station while in the idle mode, and the method further comprises performing blind decoding for the control information using the paging CID.

4. The method of claim 3, wherein the control information has a predetermined size in a predetermined location of the sub-map.

5. The method of claim 1, further comprising:
   receiving paging indication information indicating whether a paging message for at least one paging sub group is transmitted,
   wherein the receiving of the paging message is performed when the paging indication information indicates that the paging message for the paging sub group to which the mobile station belongs is transmitted.

6. The method of claim 5, wherein the paging indication information includes at least one bit indicating whether the paging message for at least one paging sub group is transmitted, and
   wherein if the paging indication information is transmitted twice or more within a paging cycle, the paging indication information is transmitted at different superframes.

7. The method of claim 6, wherein the paging indication information is transmitted at a first subframe of a superframe where a paging cycle starts, through any one of the superframe header (SFH), a broadcast channel (BCH) included in the superframe header, a data region of the first subframe of the superframe where the paging cycle starts, and a subpacket of a secondary superframe header.

8. The method of claim 6, wherein the paging interval is located at a subframe after a predetermined offset from a subframe through which the paging indication information is transmitted, and the predetermined offset is determined in accordance with the paging sub group to which the mobile station belongs.

9. The method of claim 6, wherein each of the at least one bit indicates whether a paging message for each of the at least one paging sub group is transmitted, and
   wherein if the paging indication information includes bits for all paging sub groups belonging to a predetermined paging group, the paging information is broadcasted to the mobile station through the superframe header (SFH).

10. The method of claim 1, wherein the paging sub group identifier is determined by the mobile station ID modulo N, N representing a number of paging sub groups.

11. A method for transmitting a paging message from a base station to a mobile station, the method comprising:
    receiving a deregistration request message from the mobile station;
    transmitting a deregistration command message including paging information to the mobile station, the paging information including a paging sub group identifier indicating a paging sub group to which the mobile station belongs;
    transmitting a paging message to the mobile station for a paging interval of the paging sub group, wherein the paging message includes a system information update indication (SIUI) field; and
    transmitting updated system information via a superframe header (SFH) transmitted at a first subframe of a next superframe after the transmitting of the paging message including the SIUI field if the SIUI field indicates a presence of the updated system information,
    wherein the paging sub group is different from a paging group, the paging group is determined by a geographical location, the paging sub group is determined by a mobile station ID, and the paging sub group is maintained while the mobile station is being operated in an idle mode regardless of the geographical location.

12. The method of claim 11, wherein the paging interval is determined in a subframe unit.

13. The method of claim 12, further comprising:
    receiving a paging indication message for the mobile station from a paging controller; and
    transmitting paging indication information to the mobile station, the paging indication information indicating whether the paging message for the paging sub group to which the mobile station belongs is transmitted.

14. The method of claim 13, wherein the paging indication information is transmitted at a first subframe of a superframe where a paging cycle starts, through any one of the superframe header (SFH), a broadcast channel (BCH) included in the superframe header, a data region of the first subframe of the superframe where the paging cycle starts, and a subpacket of a secondary superframe header.

15. The method of claim 13, wherein the transmitting of the paging message is performed at a subframe after a predetermined offset from a subframe where the paging indication information is transmitted, and the predetermined offset is determined in accordance with the paging sub group to which the mobile station belongs.

16. The method of claim 11, wherein the paging sub group identifier is determined by the mobile station ID modulo N, N representing a number of paging sub groups.

* * * * *